Jan. 10, 1961    R. K. SHELBY ET AL    2,967,328
MOLDING MACHINE

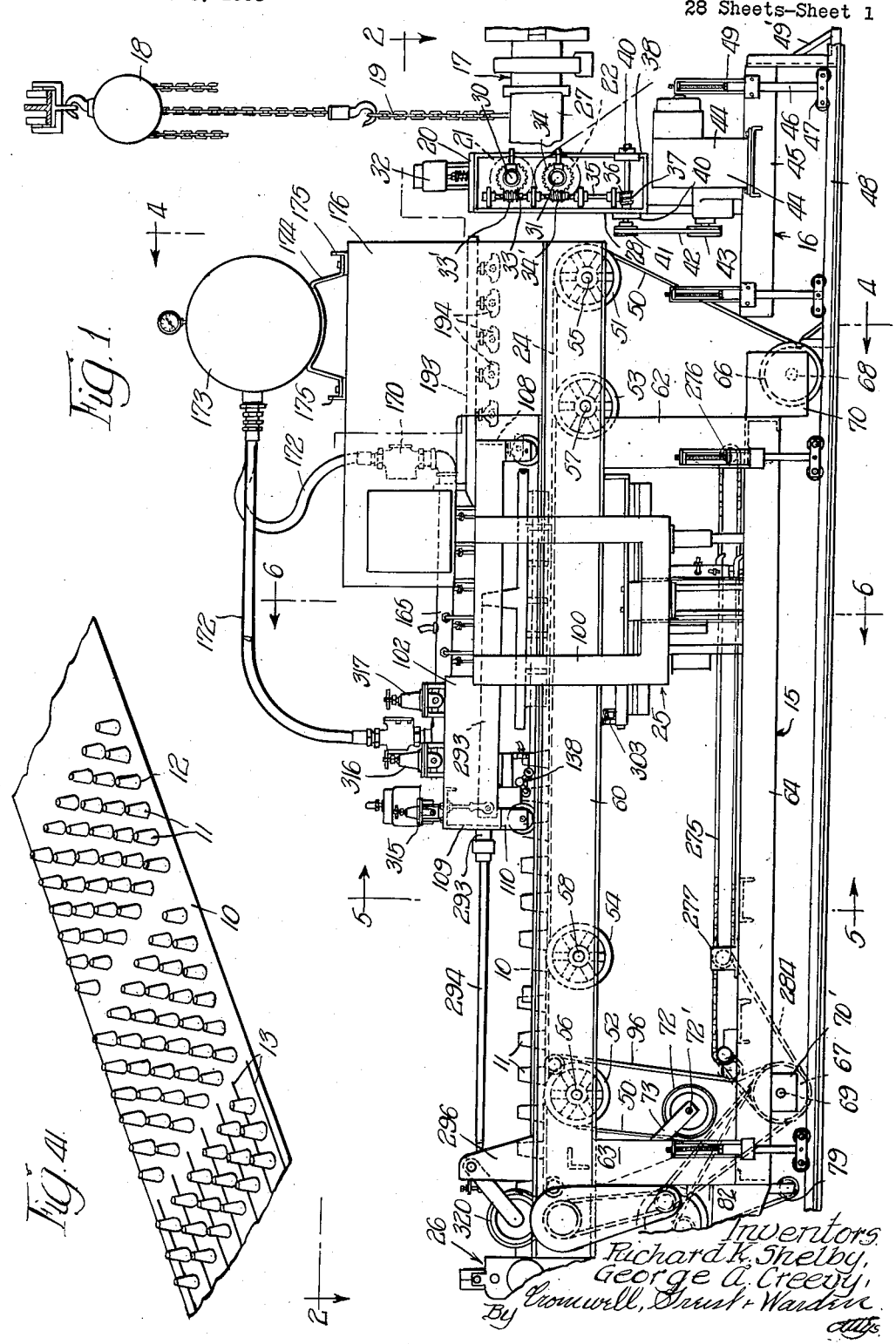

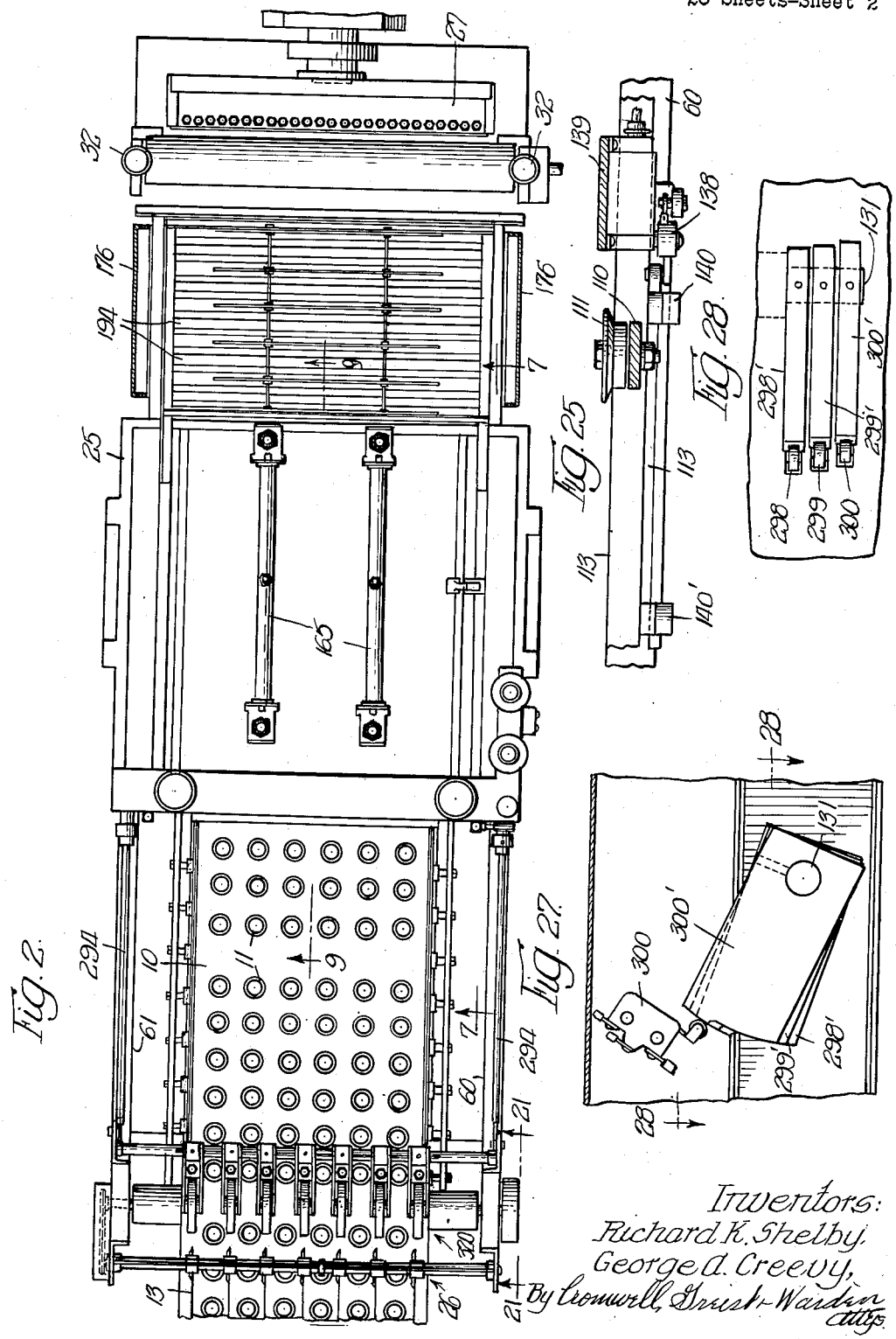

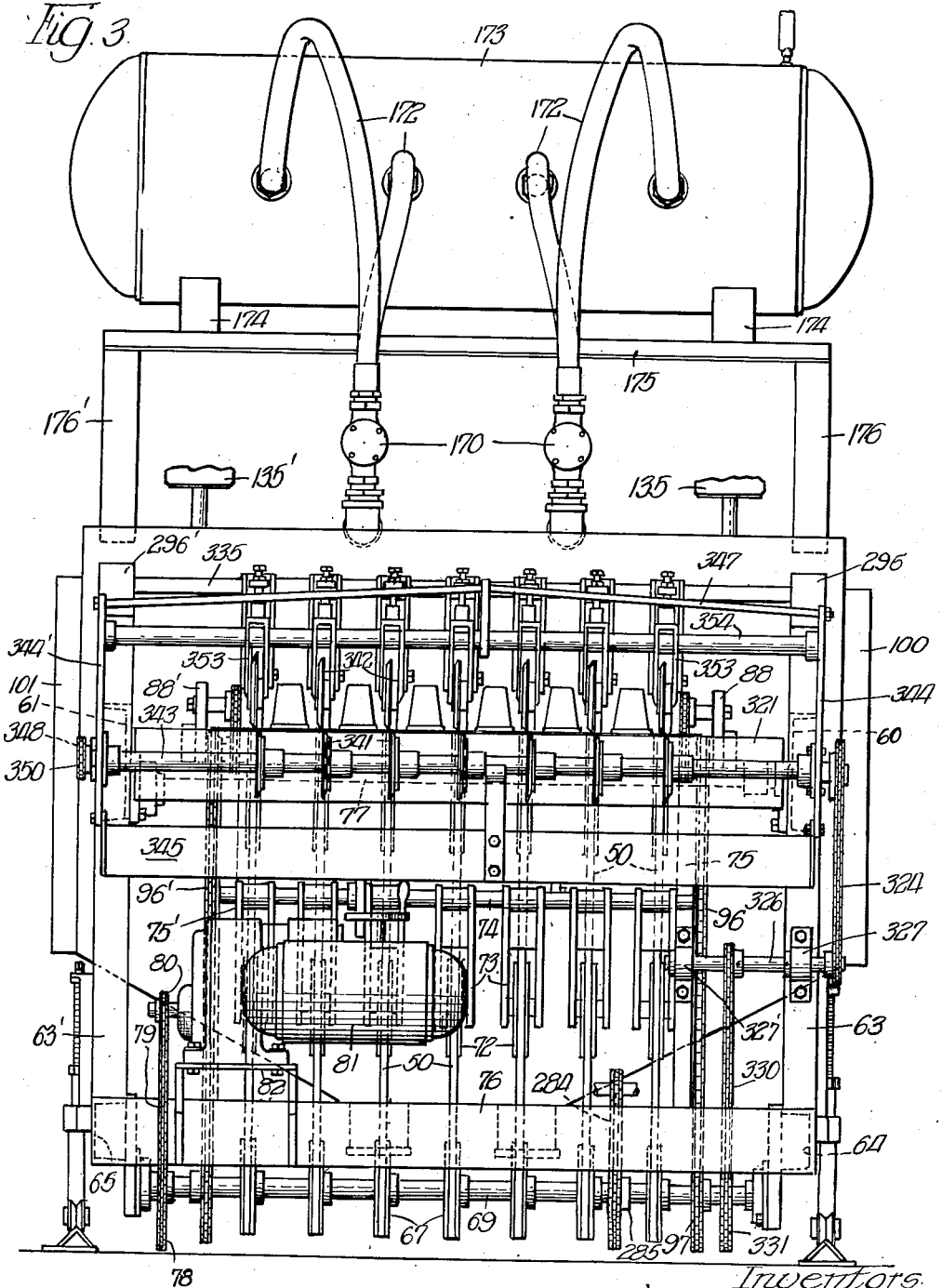

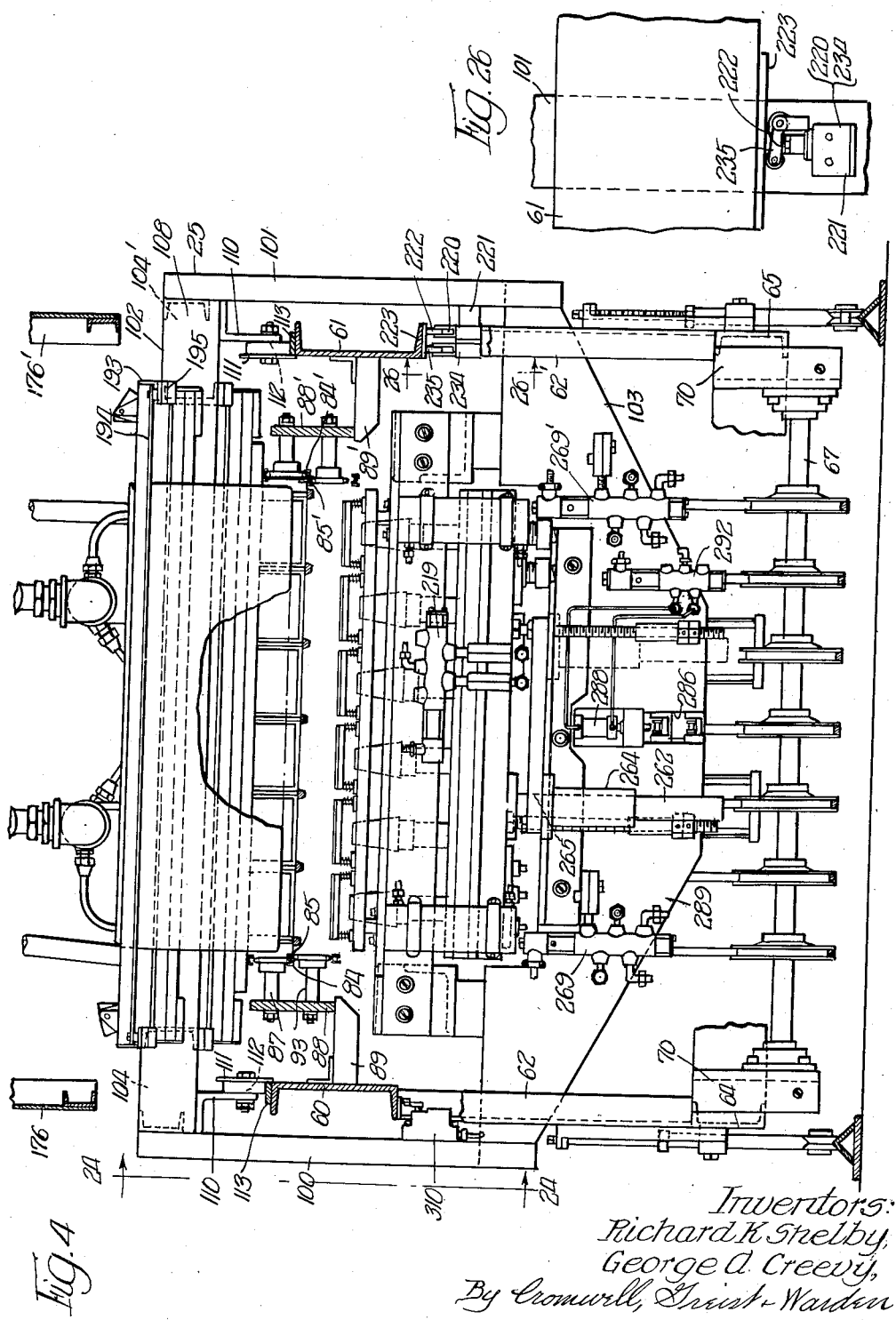

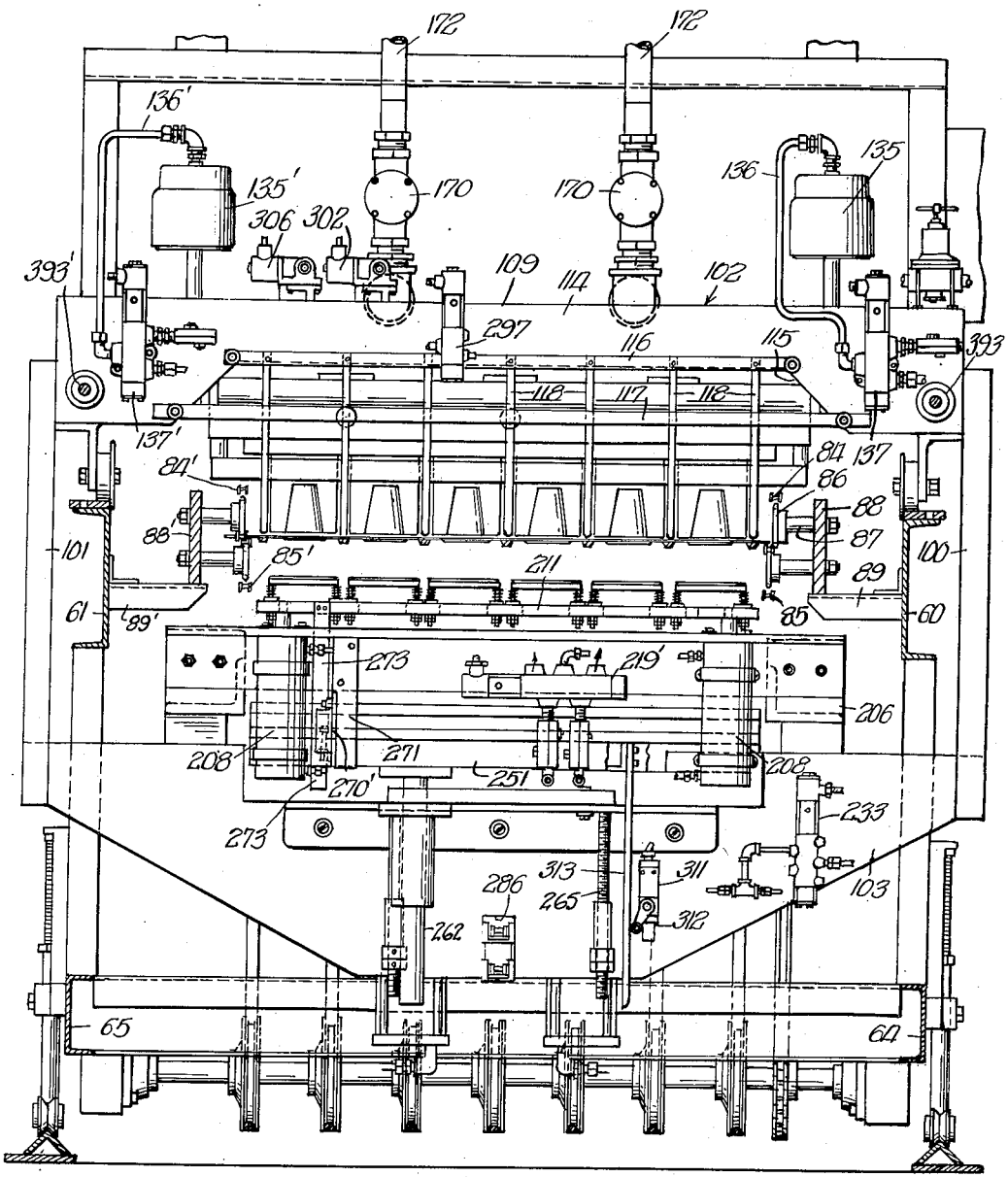

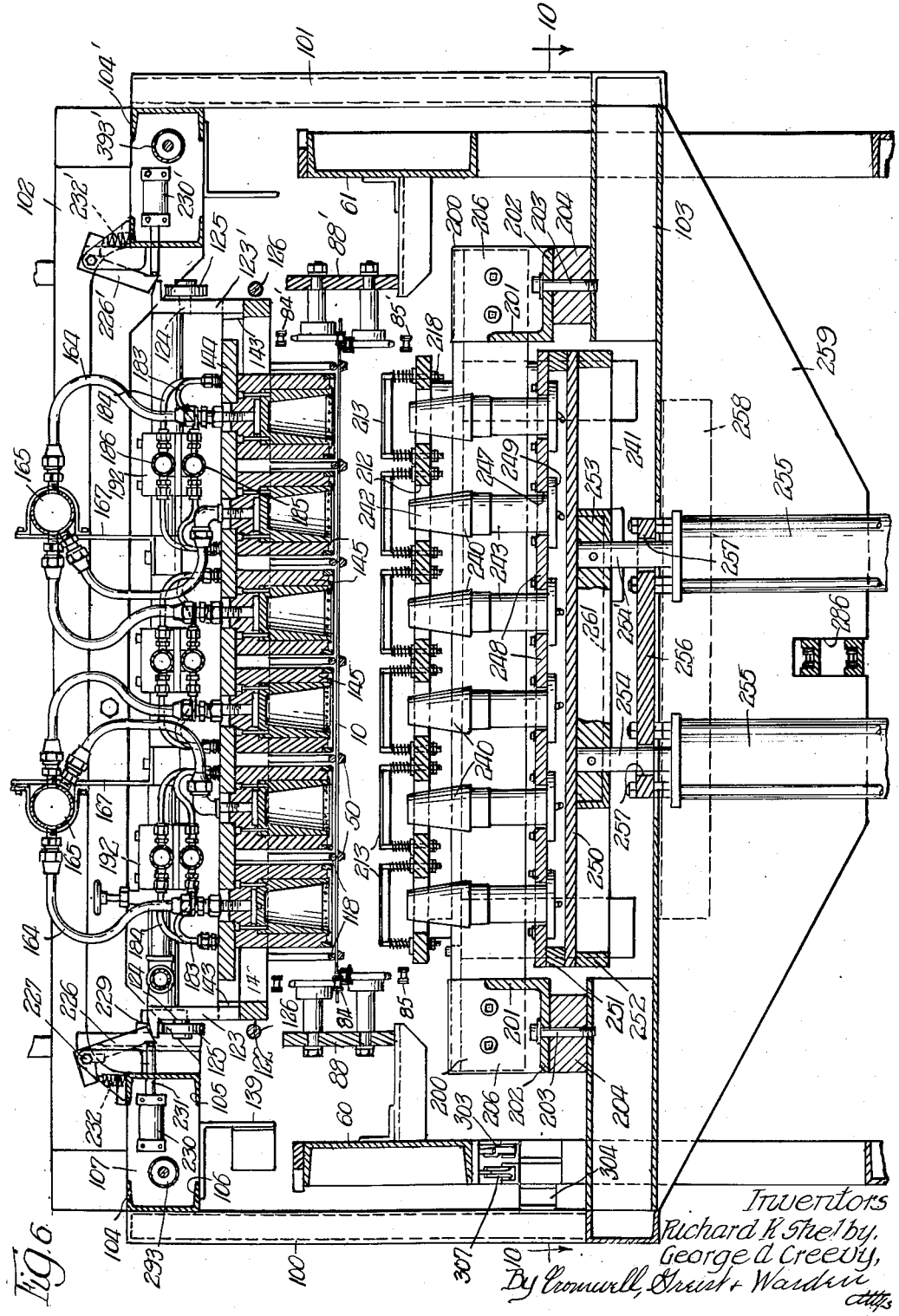

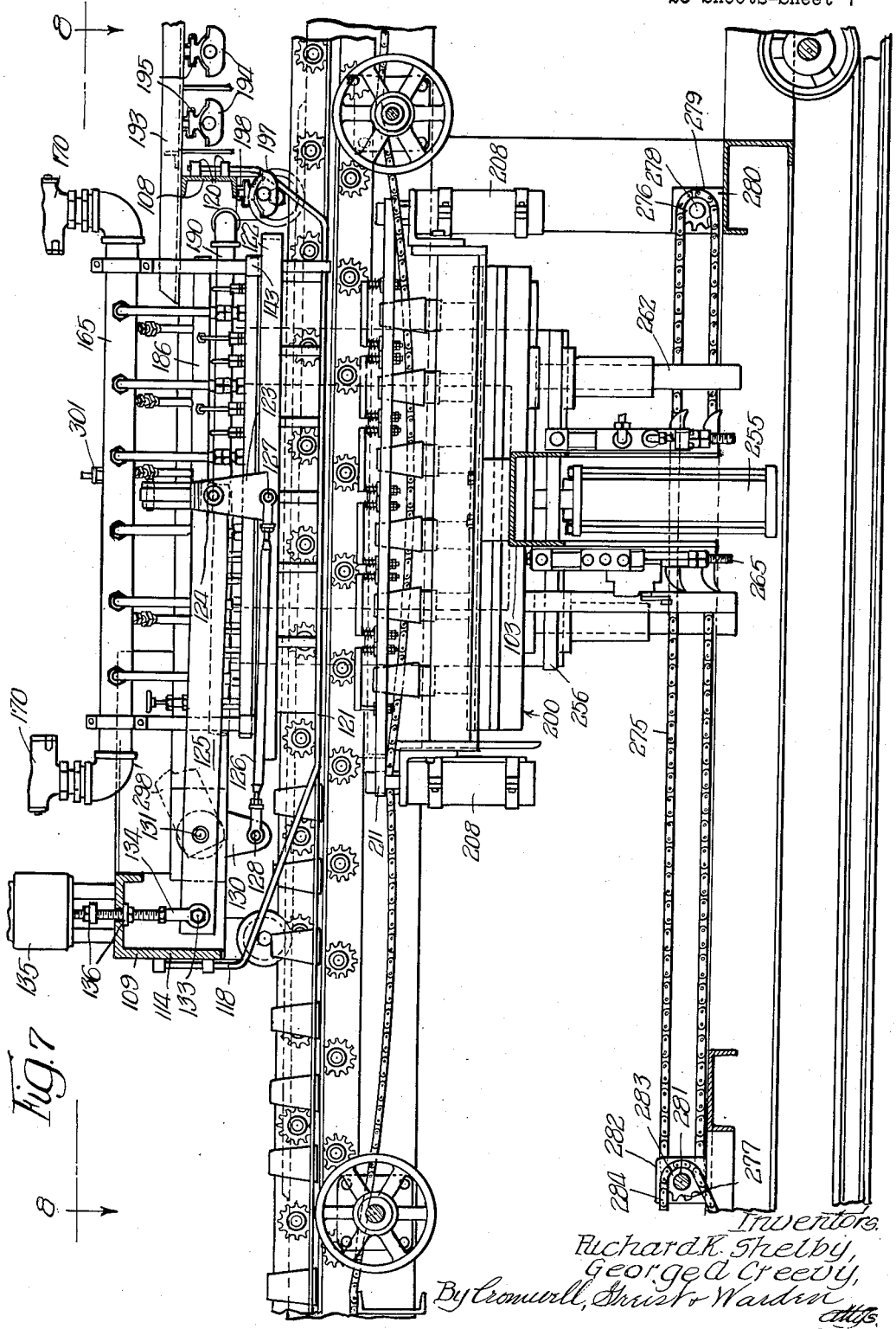

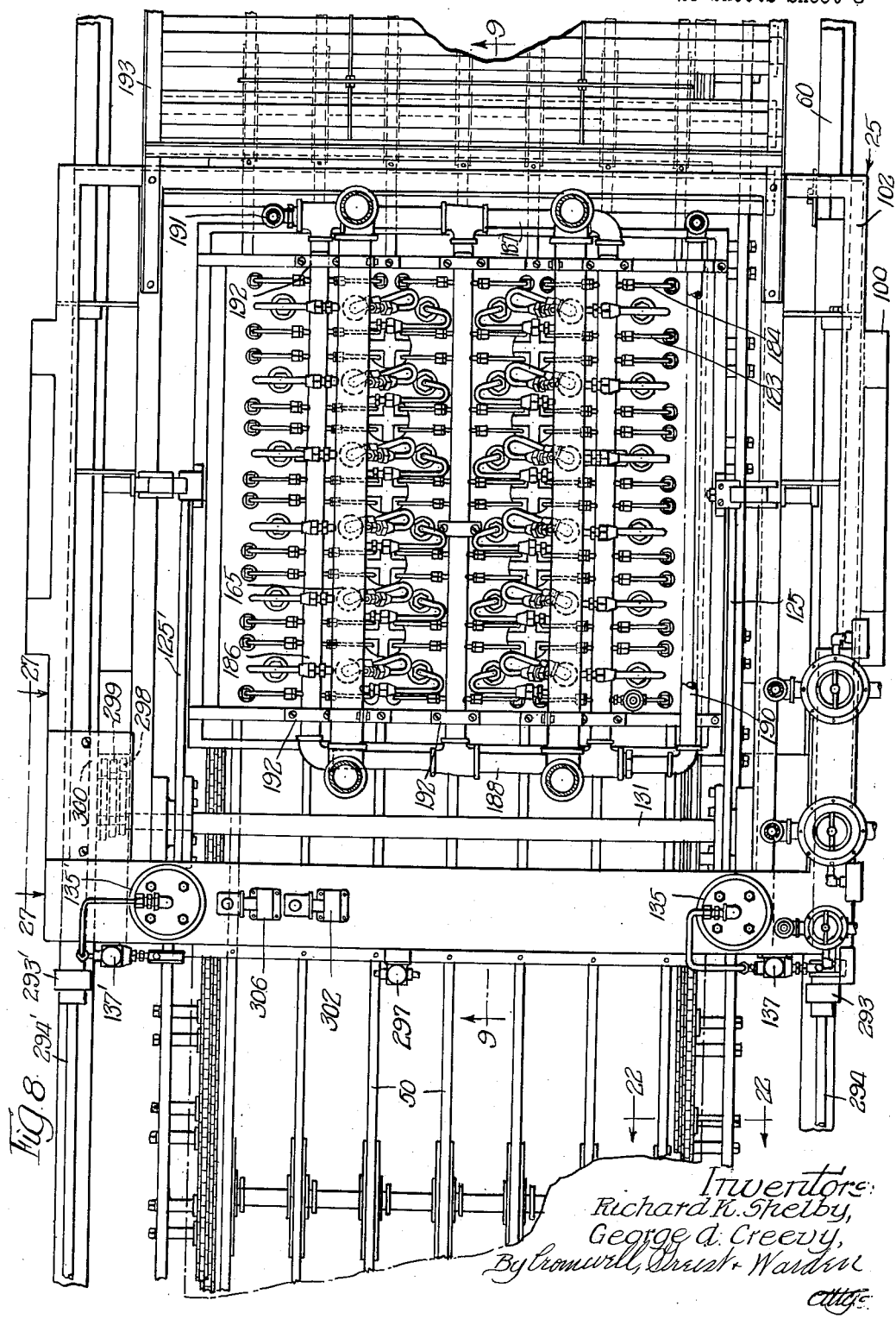

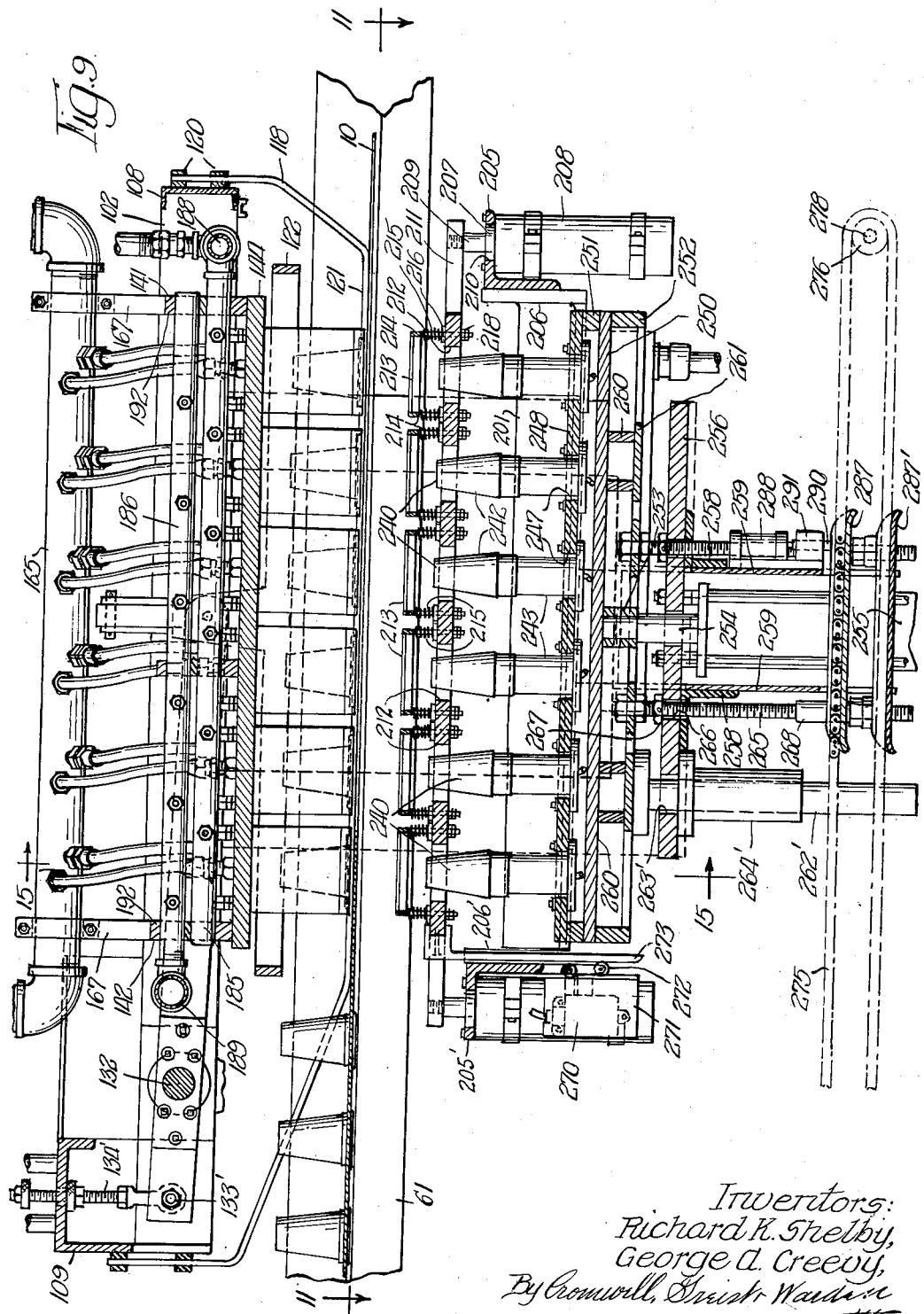

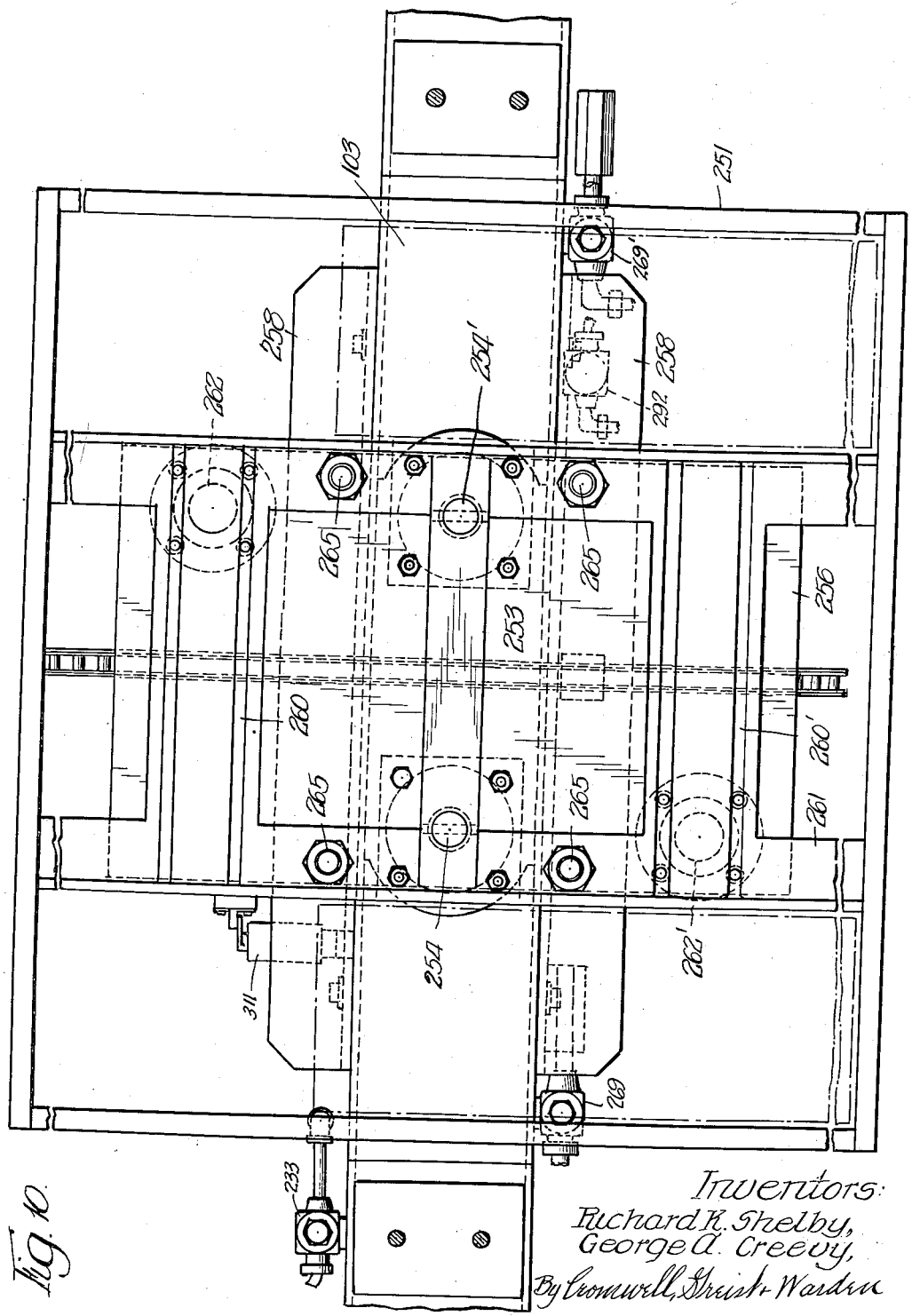

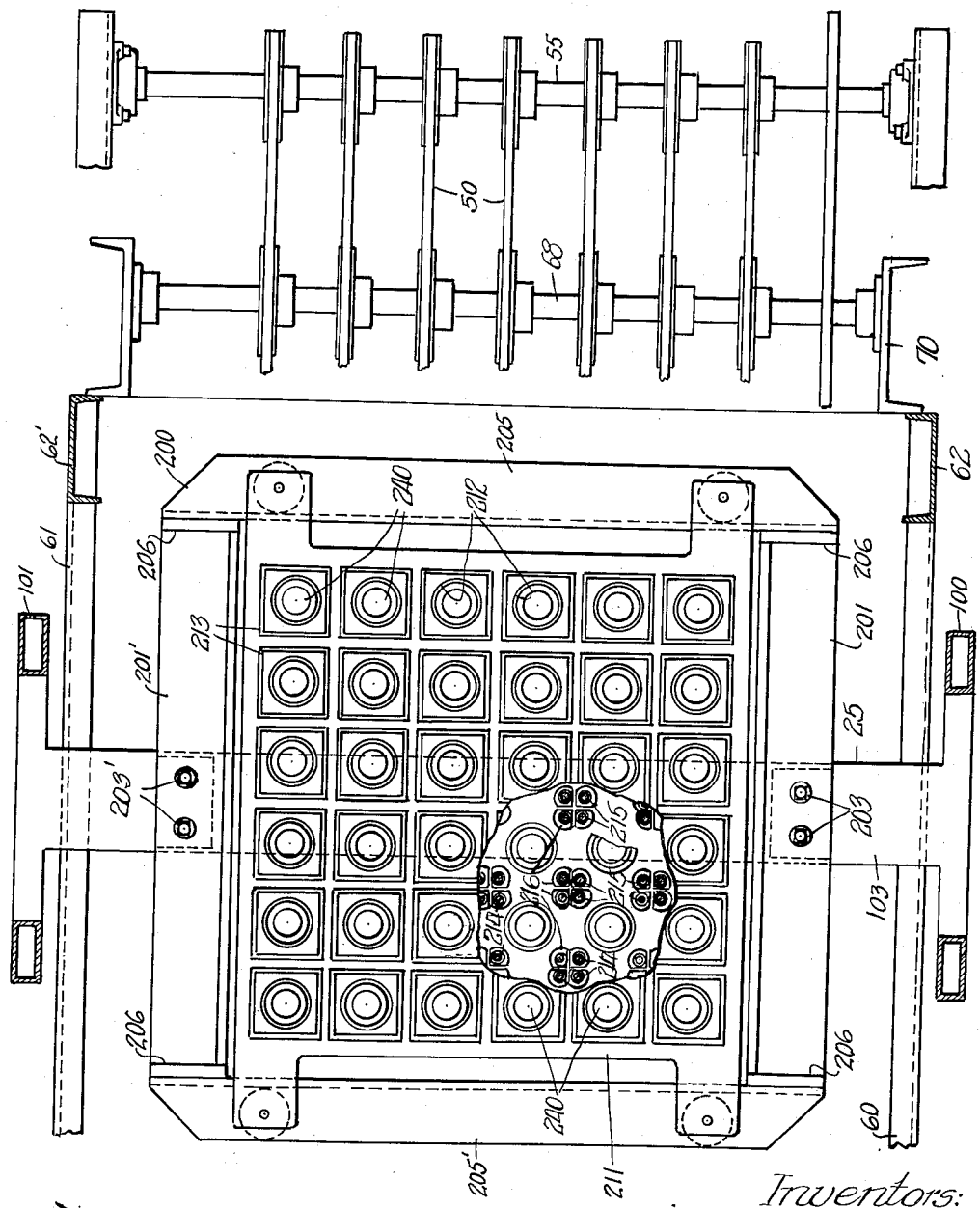

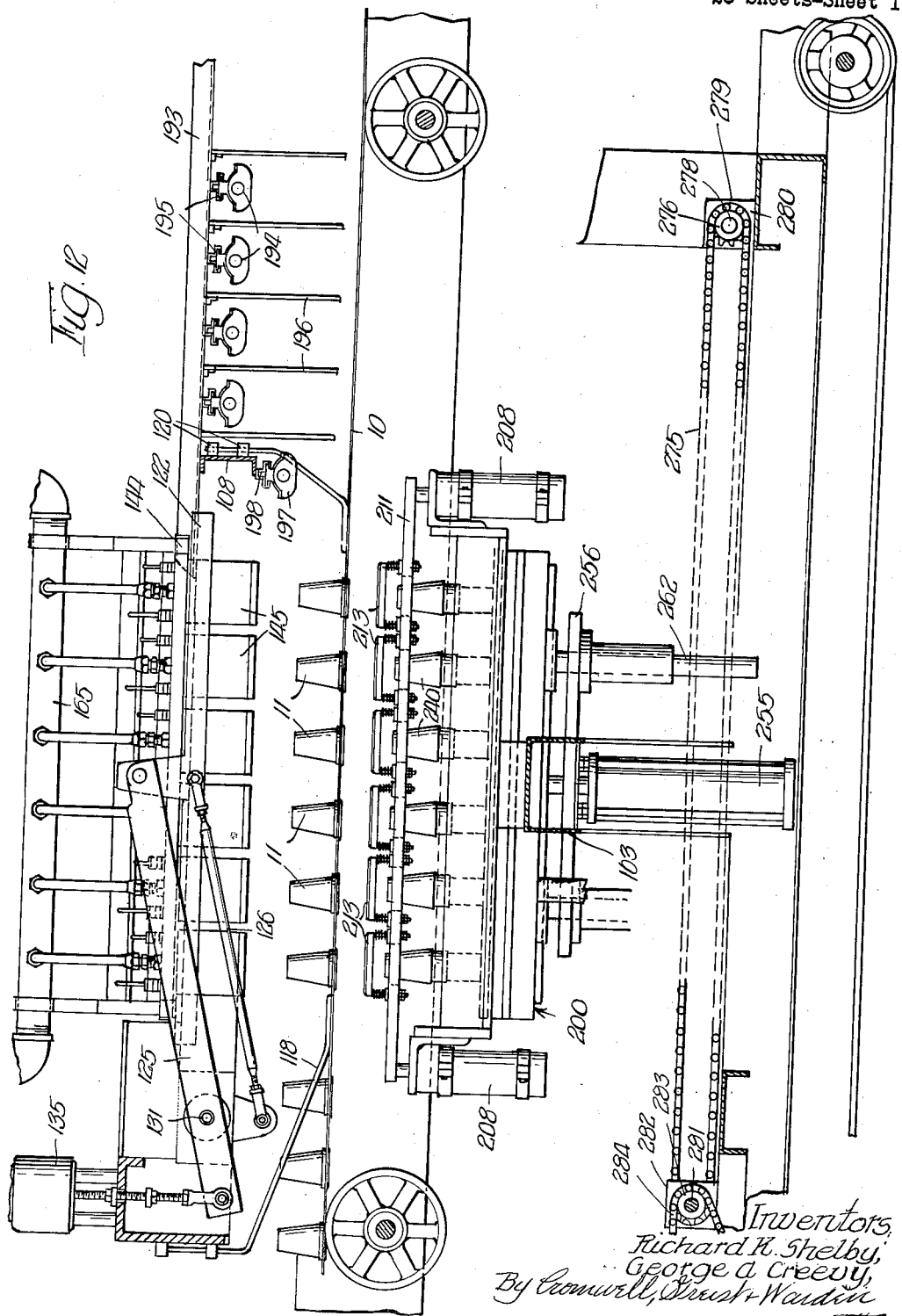

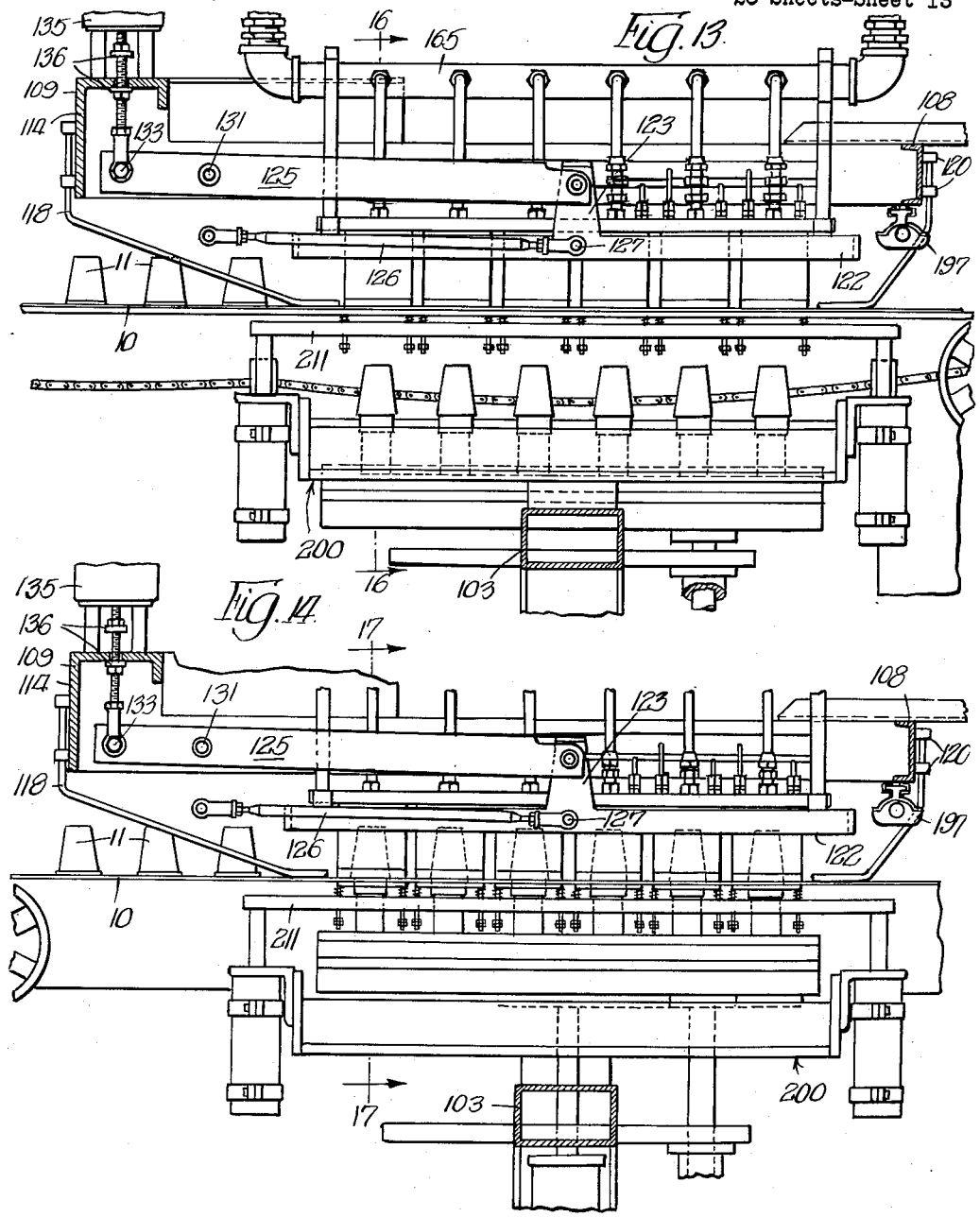

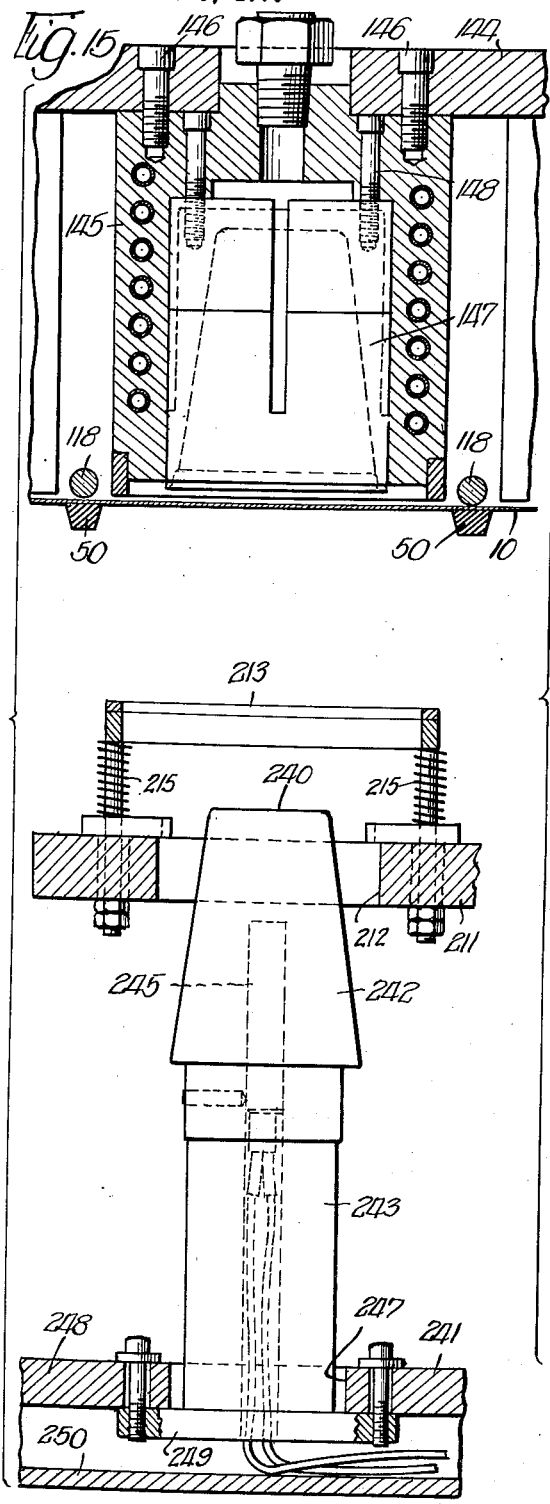
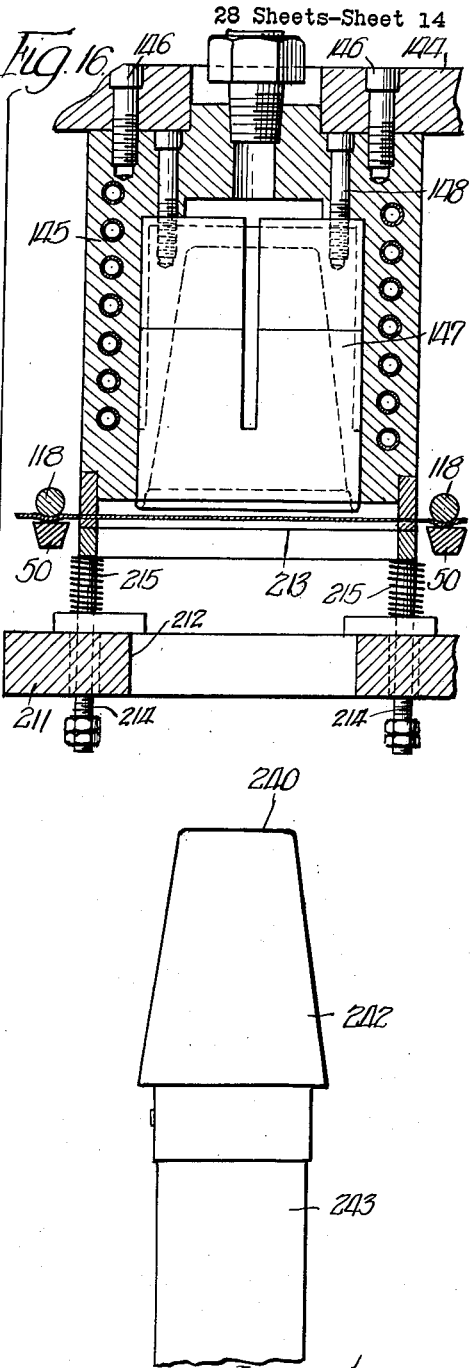

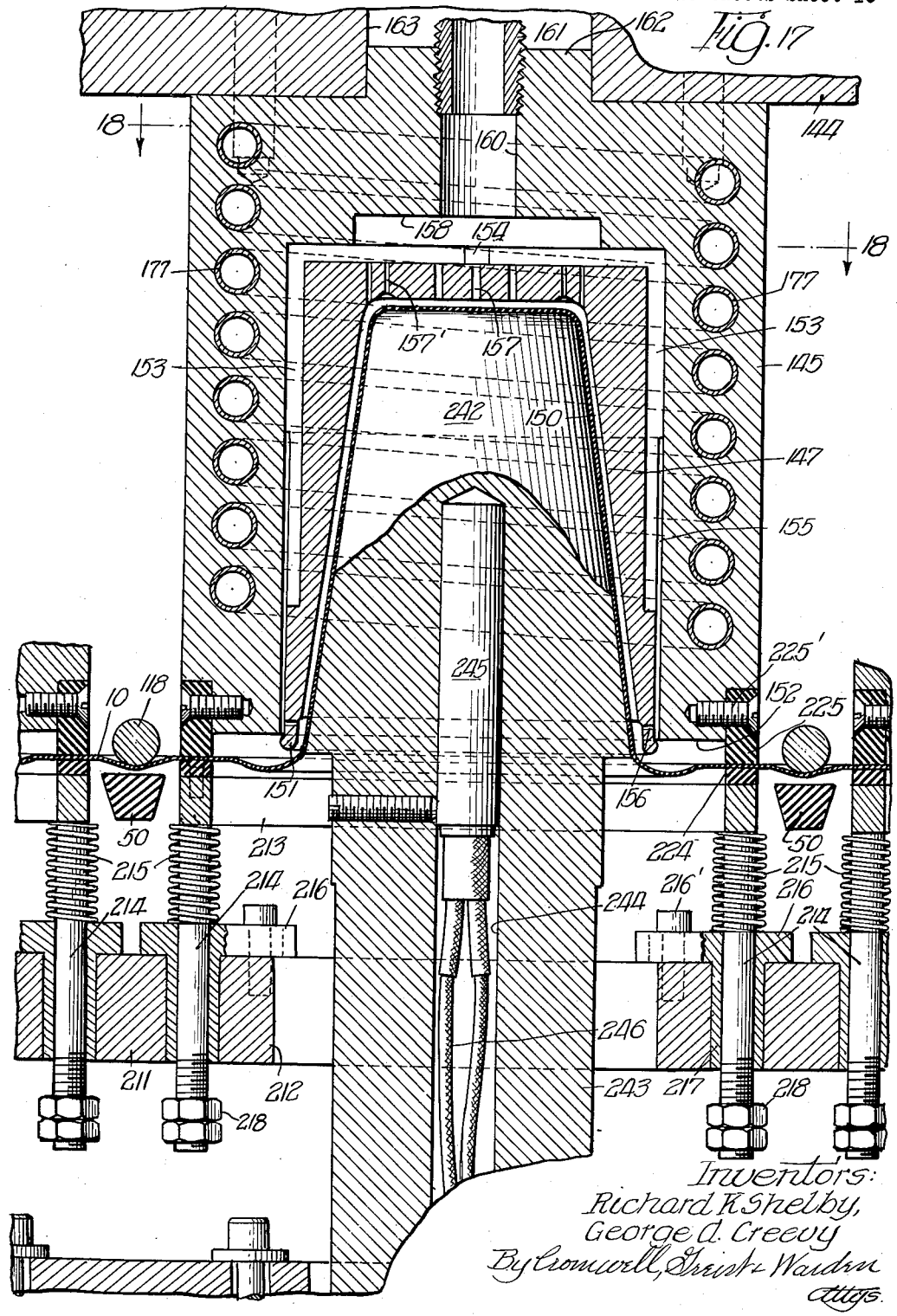

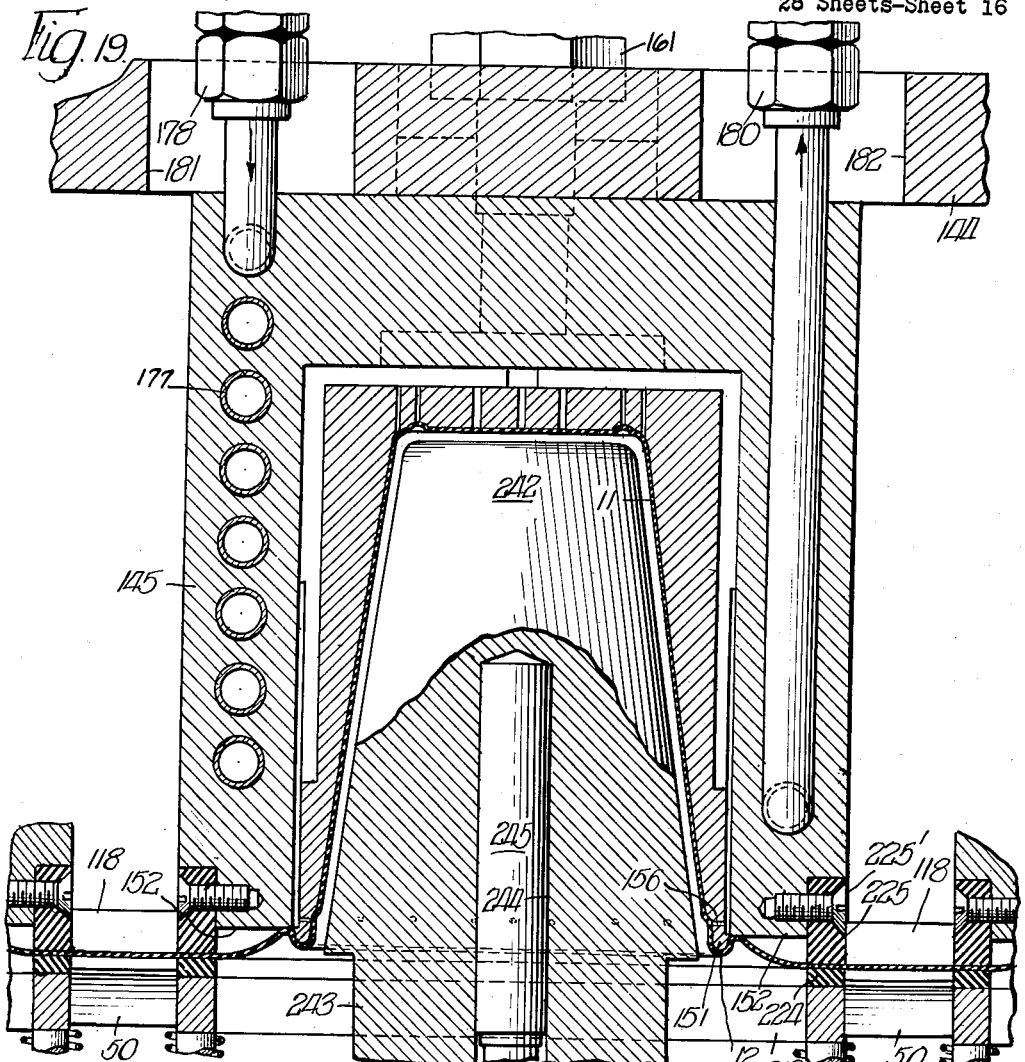
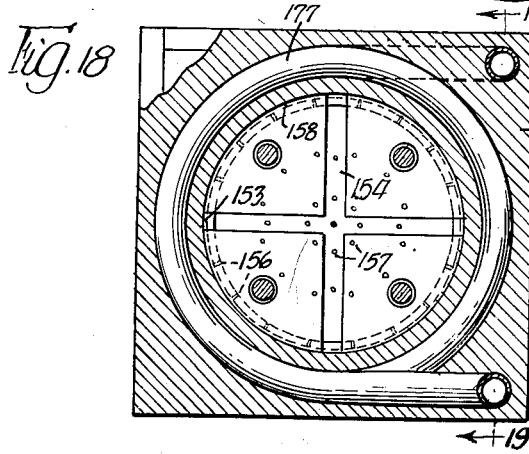
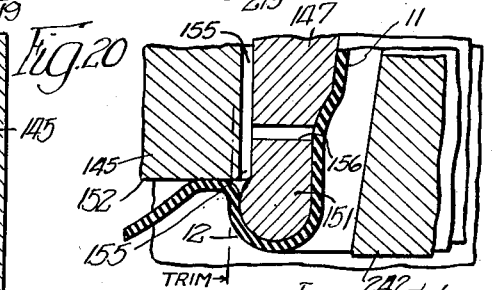

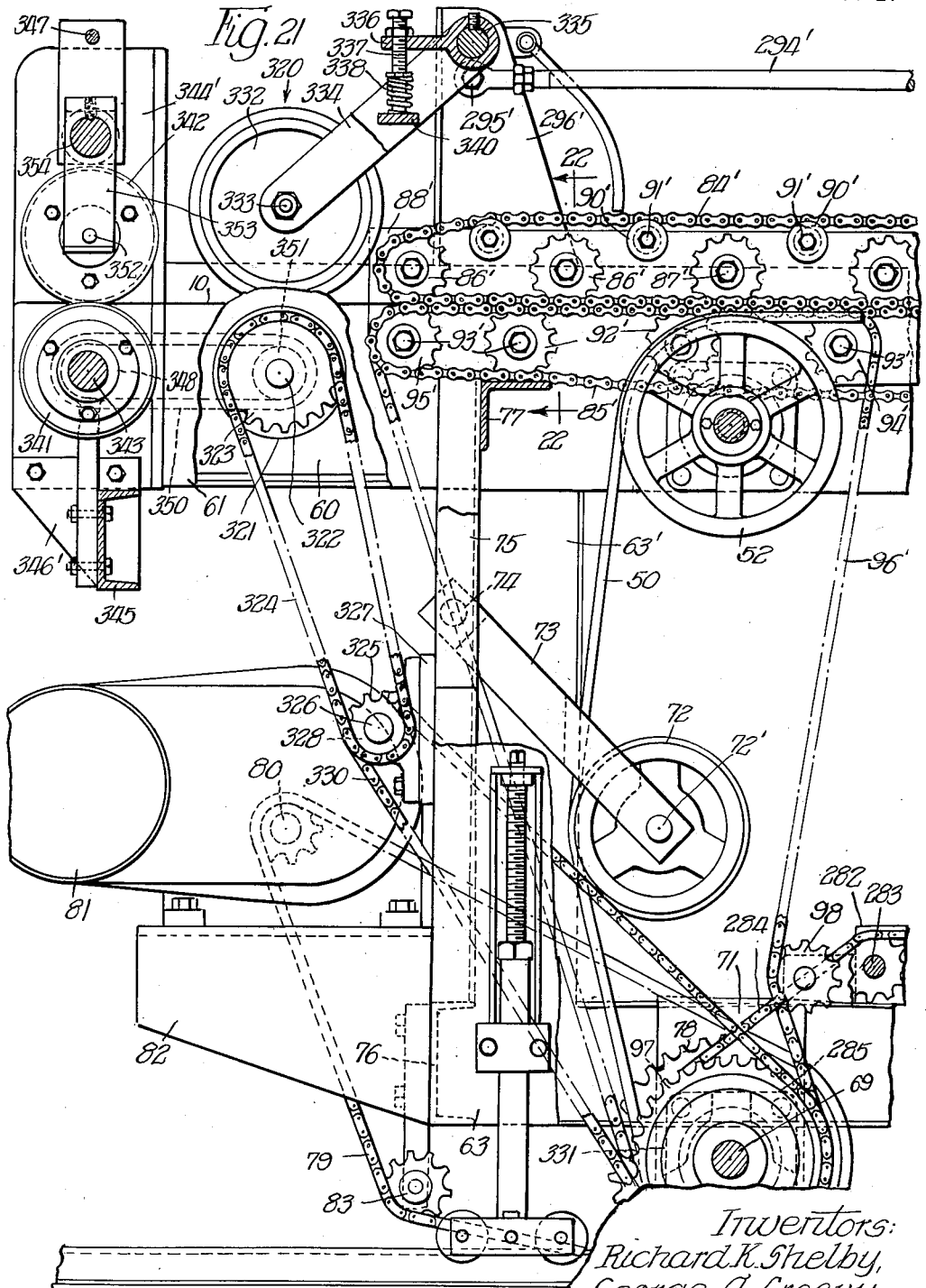

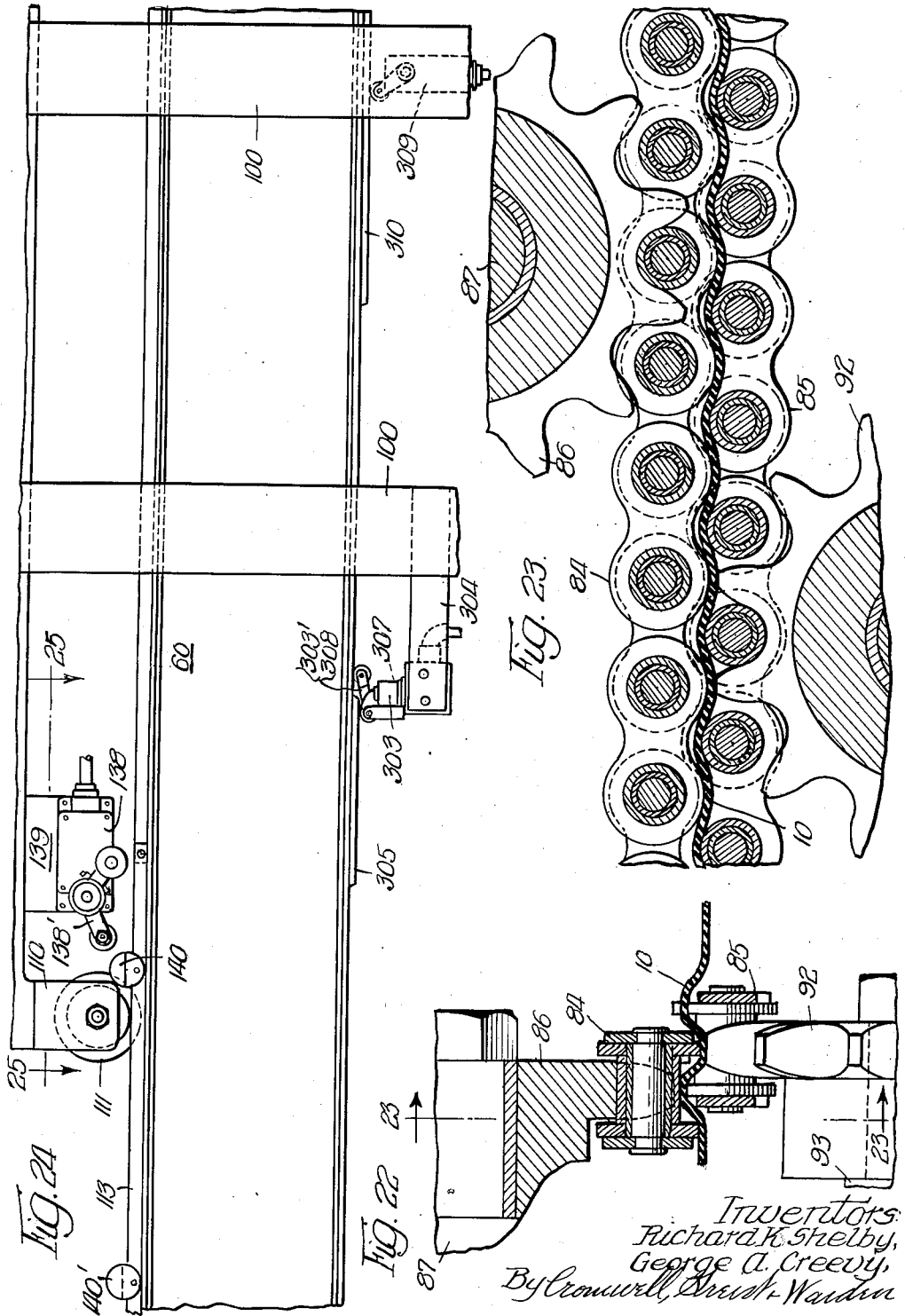

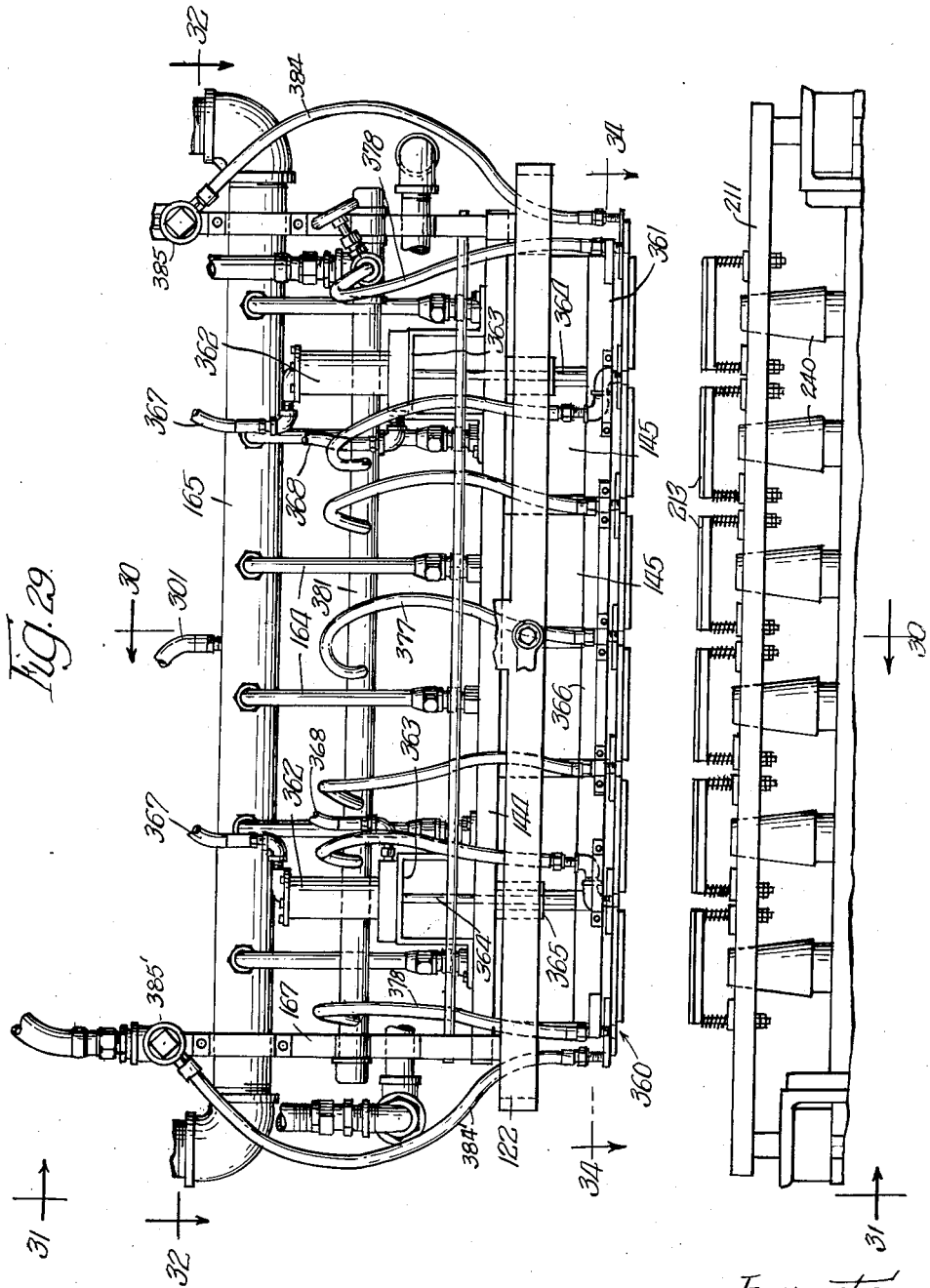

Filed Nov. 3, 1958    28 Sheets-Sheet 20

Fig. 30

Inventors
Richard K. Shelby,
George A. Creedy,
By Cromwell, Greist & Warden
Attys.

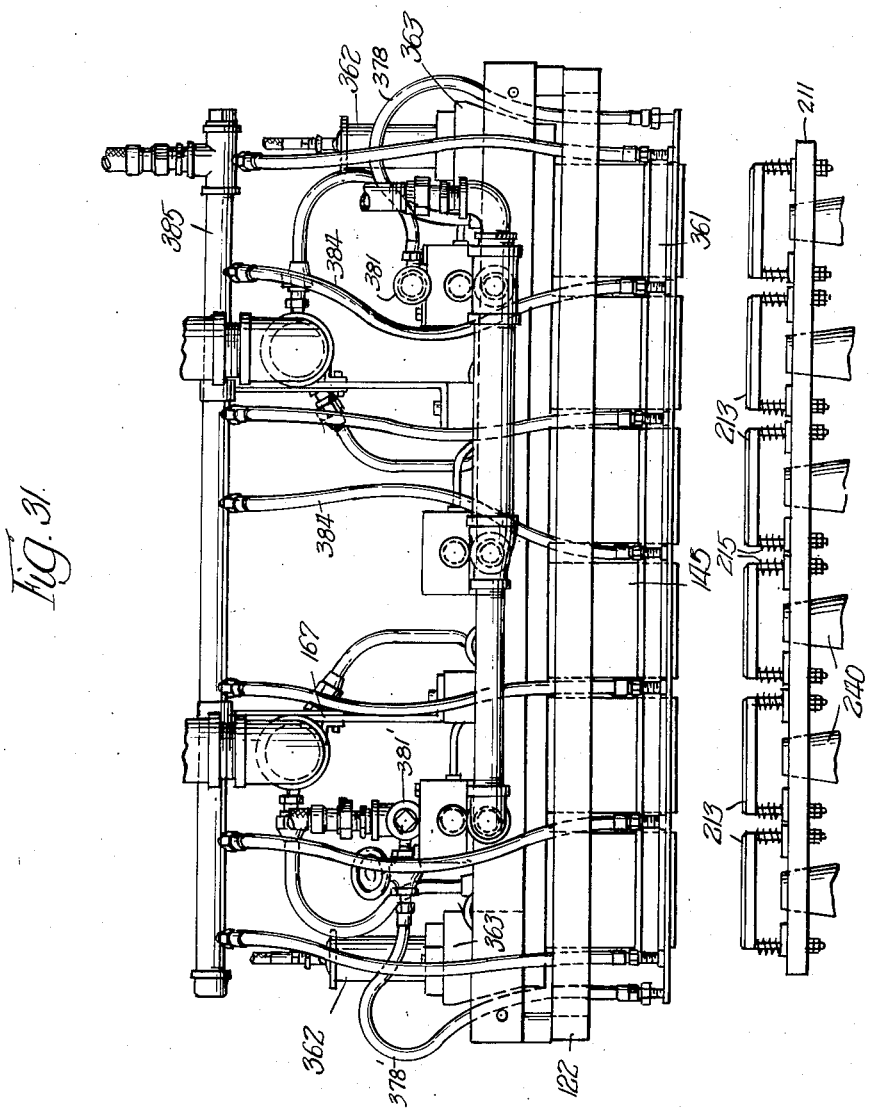

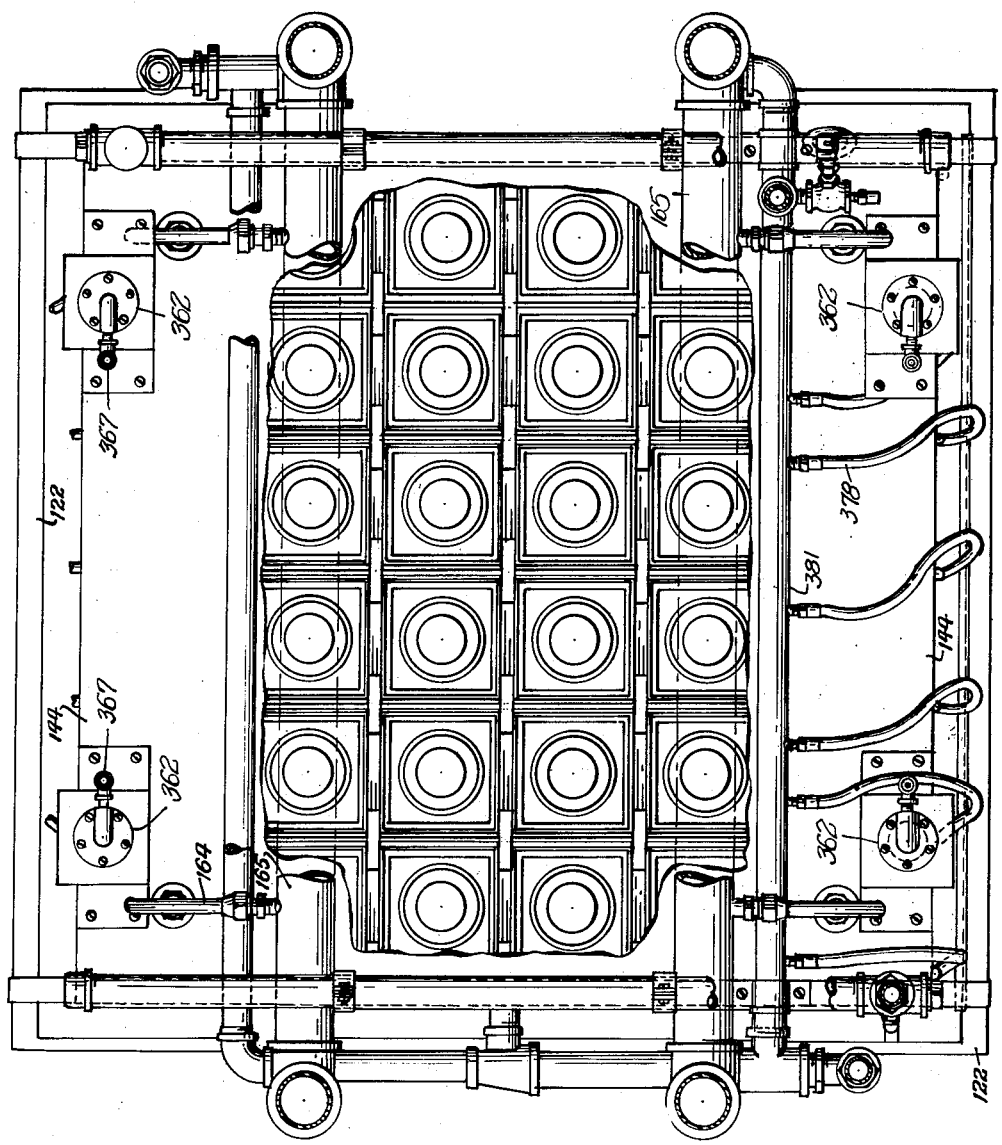

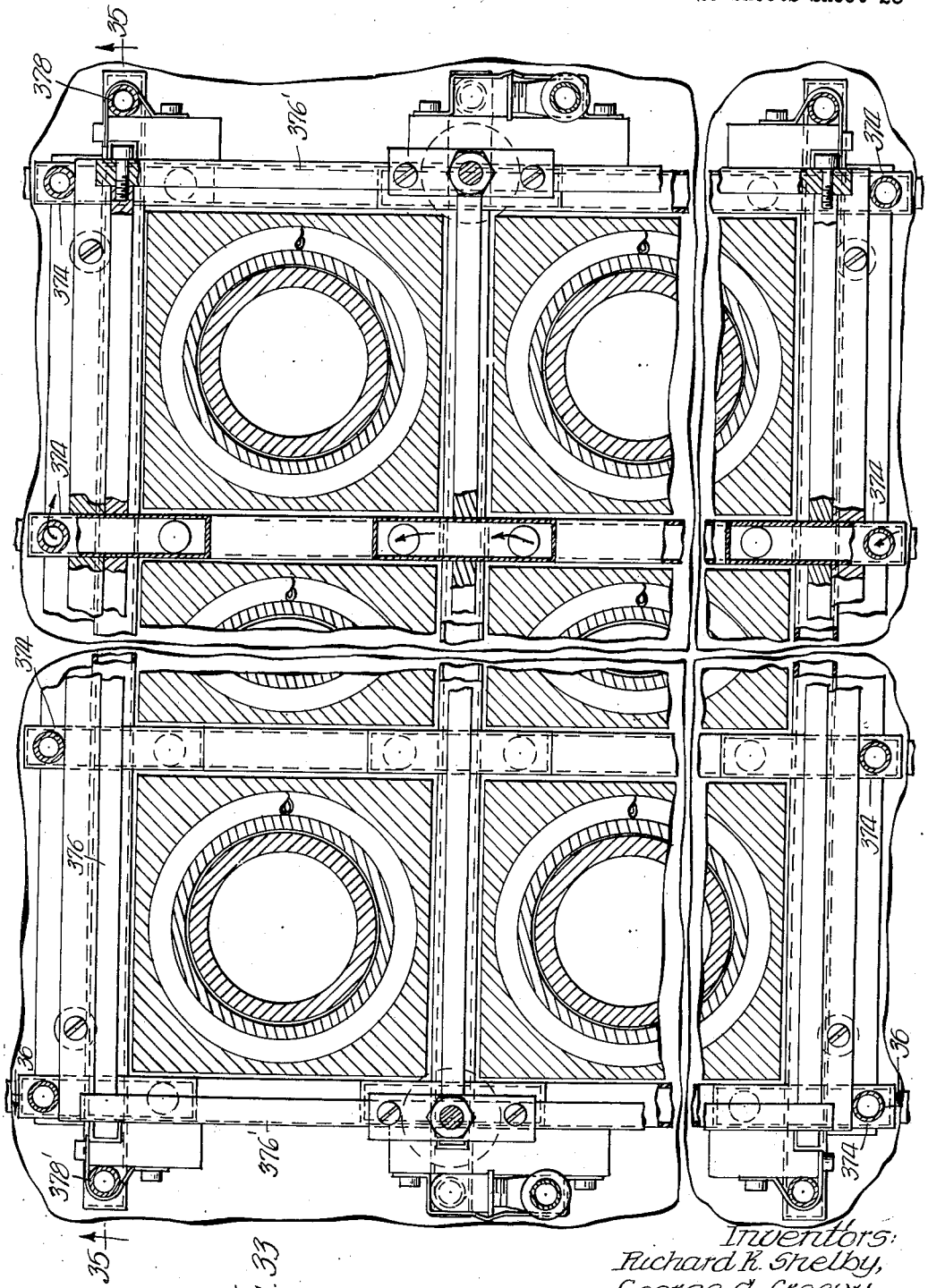

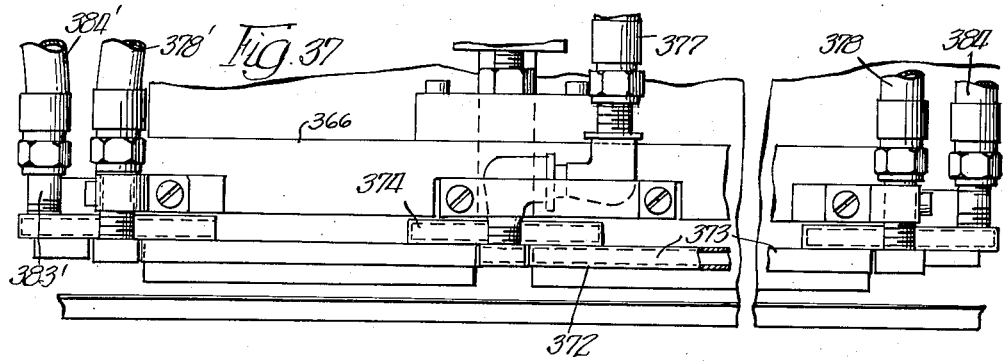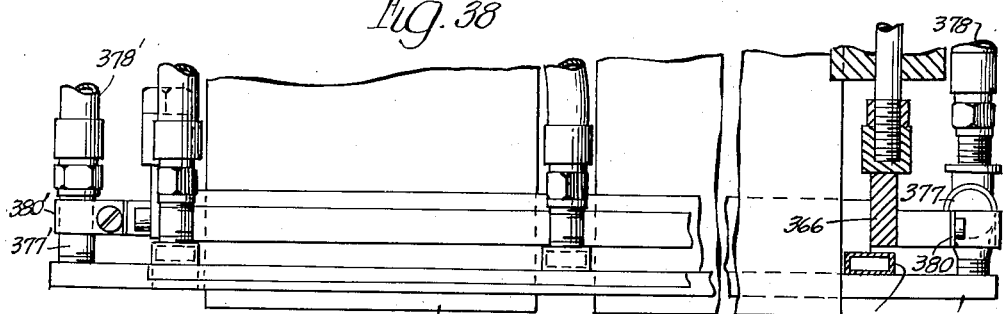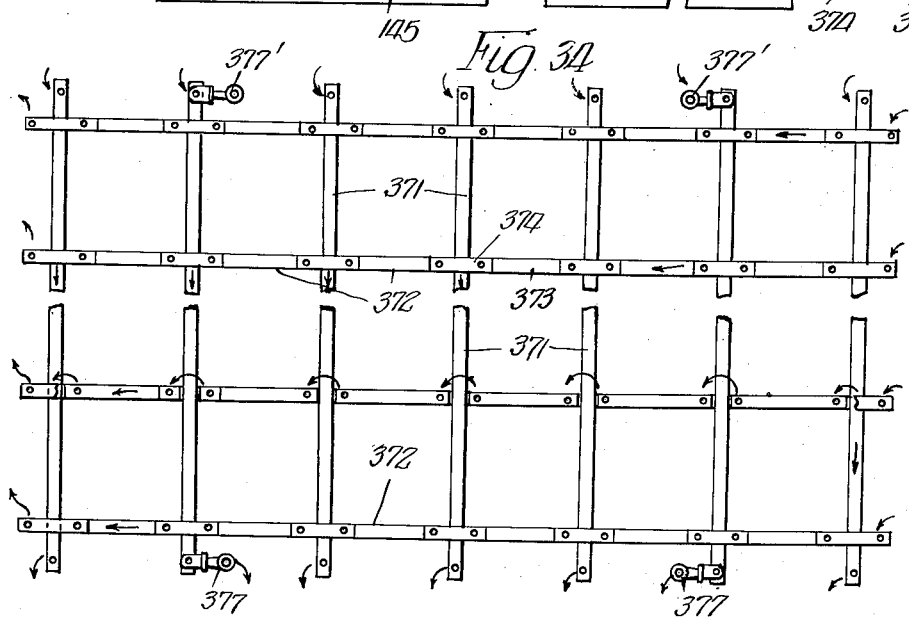

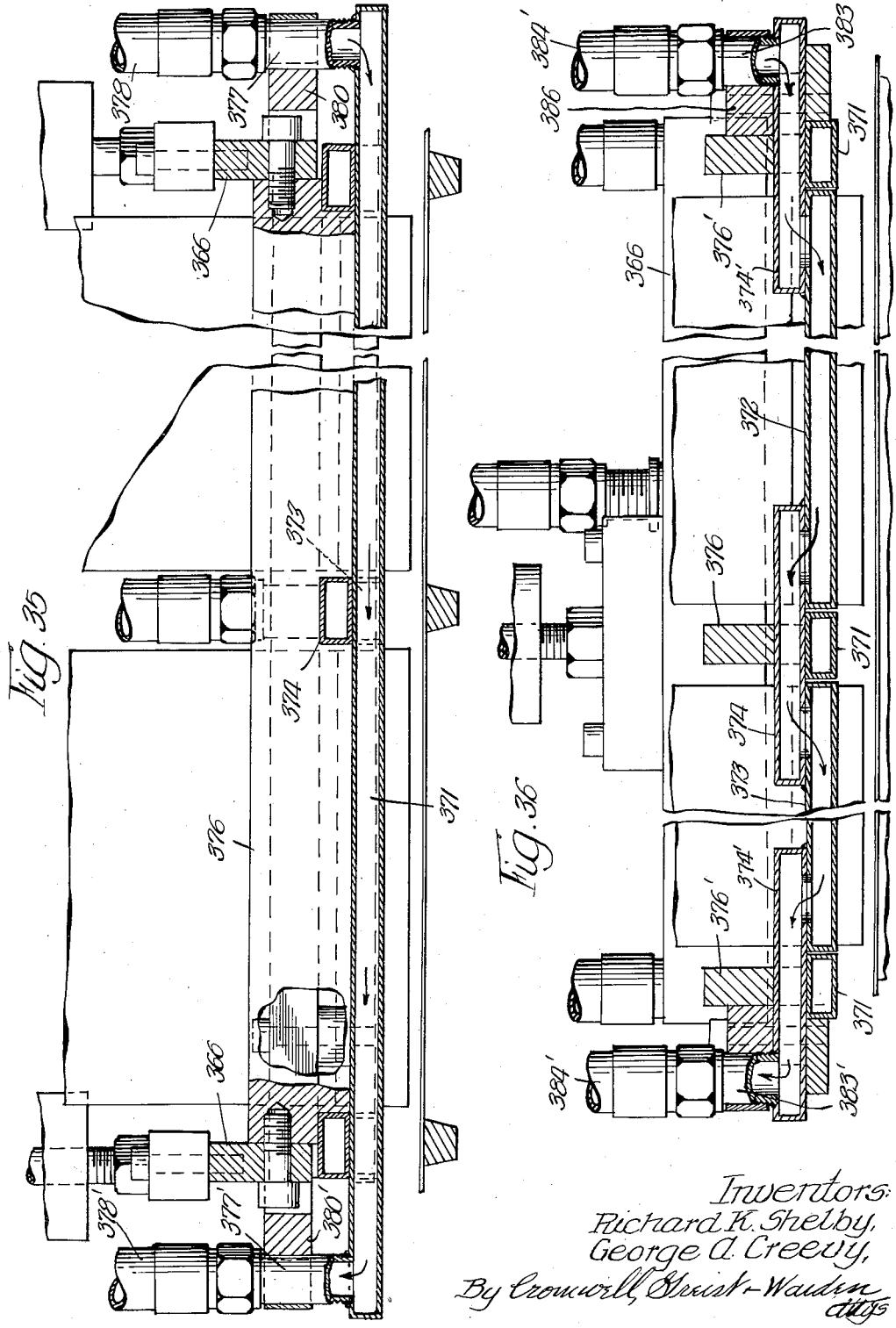

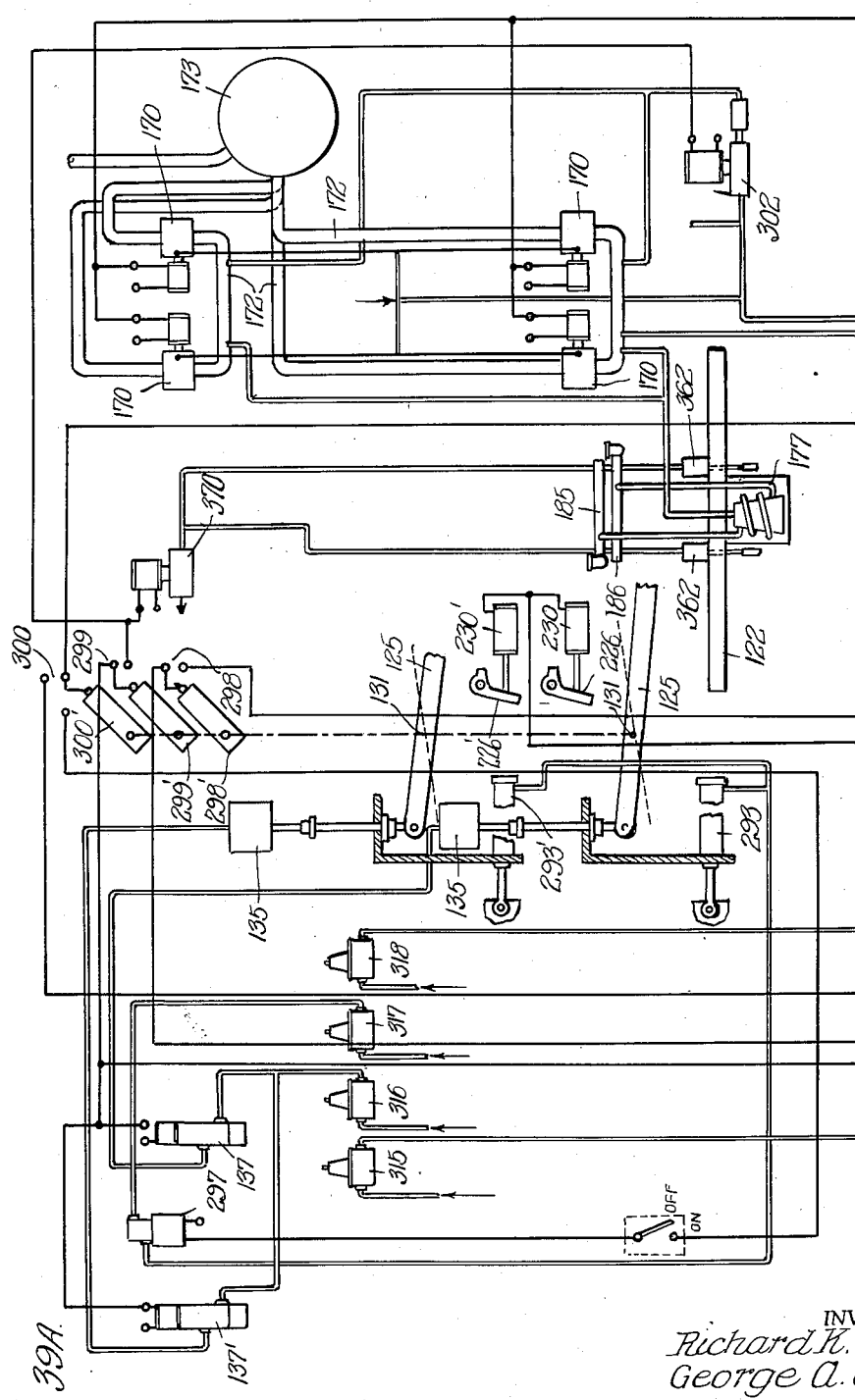

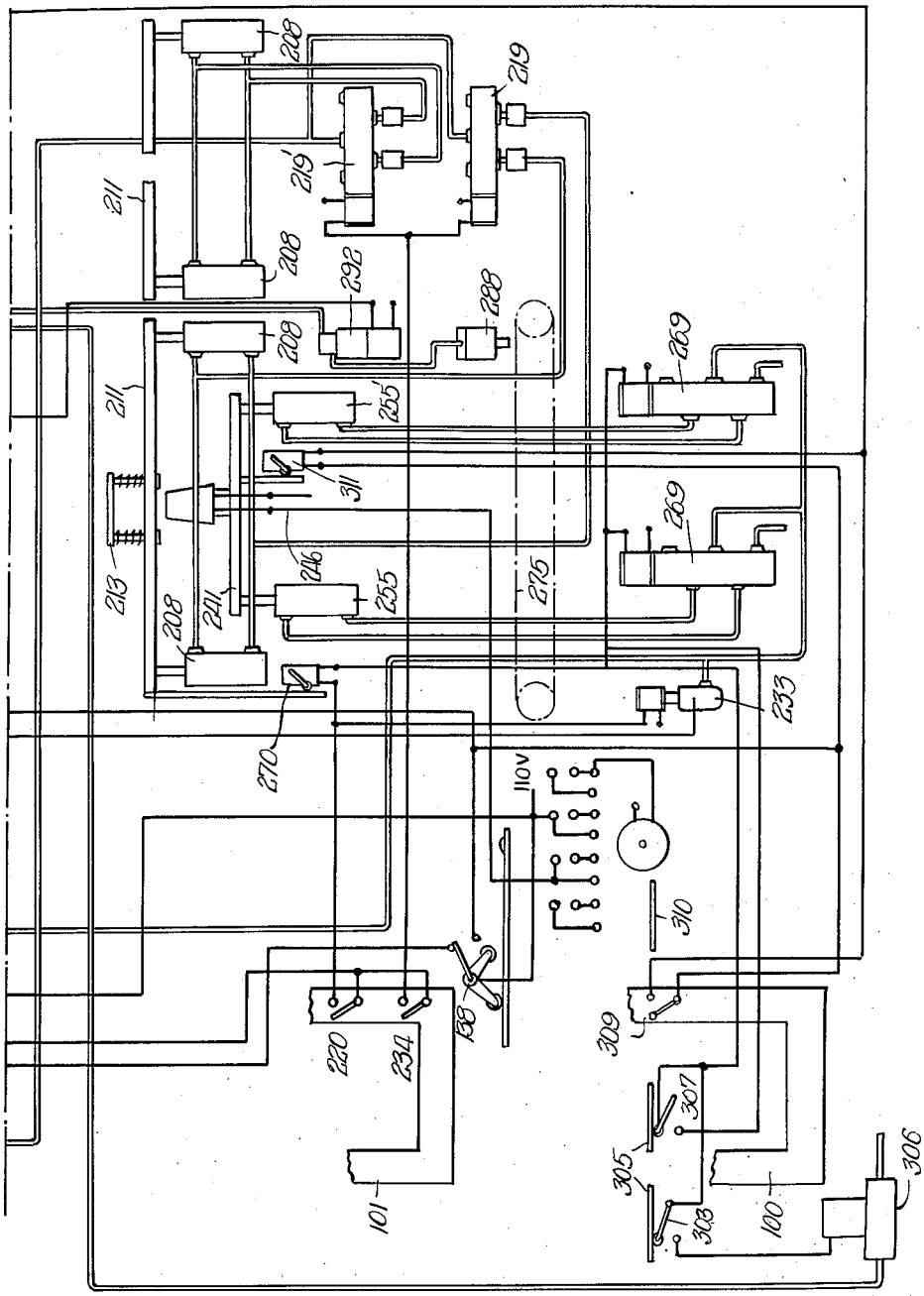

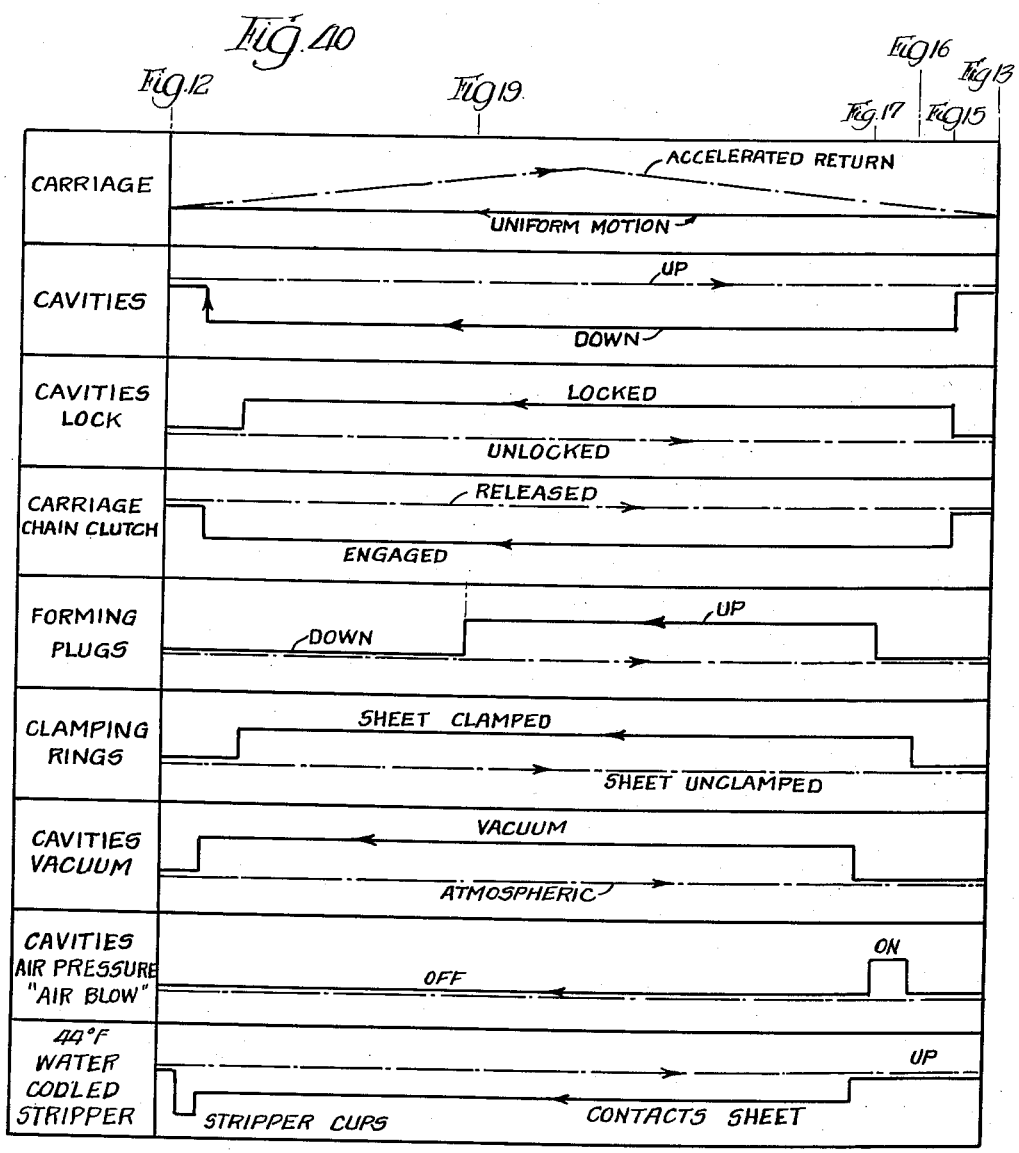

United States Patent Office 2,967,328
Patented Jan. 10, 1961

2,967,328

MOLDING MACHINE

Richard K. Shelby, Hinsdale, and George A. Creevy, Villa Park, Ill., assignors to Continental Can Company, Inc., New York, N.Y., a corporation of New York Filed Nov. 3, 1958, Ser. No. 771,535

19 Claims. (Cl. 18—19)

This invention relates to the fabrication of plastic products and is more particularly concerned with improvements in an apparatus for forming or shaping thermoplastic sheet material to produce therefrom a plurality of shaped articles.

It is a general object of the invention to provide an improved apparatus for continuously advancing a web of thermoplastic sheet material which is delivered from an extruder and rapidly forming from the traveling web successive groups of shaped articles.

It is a more specific object of the invention to provide an apparatus for rapidly forming a plurality of shaped articles from an endless web of thermoplastic material wherein the web material is at all times maintained under positive control as it is advanced from an extruder past a forming station at which a series of forming operations are carried out by apparatus mounted on traveling carriages, with the carriages being advanced with the web while the drawing or forming operations are performed on successive areas of the web.

It is another object of the invention to provide an apparatus for forming successive articles from a traveling web wherein the web is advanced by a supporting mechanism which is operative to positively grip the longitudinal edges of the web so as to hold the web in extended position and to support the intermediate portions of the web while it is moved through a forming station where it is operated upon by several mechanisms constituting the web holding and drawing elements of the apparatus.

It is another object of the invention to provide a machine for forming a plurality of articles from a continuously traveling web of plastic material which machine is provided with a conveyor having means on a horizontally extending run thereof for gripping the longitudinal edges of the traveling web as it is received from an extruder and associated sizing rolls at the one end of the machine for advancing the web in a horizontal plane, and a traveling carriage mounted for reciprocating movement in a horizontal path and in the direction of movement of the traveling web which carriage has mounted thereon web holding and article forming and shaping elements, with the latter elements having reciprocating movements in a vertical direction normal to the faces of the traveling web.

It is another object of the invention to provide a molding machine having a traveling carriage on which a series of mold cavities and cooperating plug assists are mounted for reciprocation toward and from a traveling web which is carried between the same and on which web gripping frame members are provided which are operable to grip portions of the web during the article forming operations and to release the same after the articles are formed therein.

It is a still further object of the invention to provide a molding machine having a reciprocable carriage on which cooperating molding elements are mounted for movement toward and from each other and into and out of molding position relative to a continuously traveling web of plastic sheet material which is advanced between the same and having an article stripping mechanism on the carriage which is operable to engage the web after the articles are formed so as to prevent the articles from following the forming elements as they are moved out of operative position.

It is another object of the invention to provide a machine for molding a plurality of articles from a traveling web of plastic film material wherein the web is advanced in a horizontal plane with its edges clamped to a conveyor which supports the web in extended position, a series of cooperating male and female forming dies are provided which are mounted on a traveling carriage, with the carriage being arranged to travel a predetermined distance with the web and with the forming dies being mounted to reciprocate in a direction laterally of the travel of the web toward and from opposite faces of the web so as to form articles by drawing portions of the web into the cavities in the female dies, and wherein a water cooled reciprocably mounted stripping frame is associated with the female dies and is operated to engage with the face of the web between the dies, when the dies are withdrawn, in a direction laterally of the web thereby preventing the articles formed in the cavities from following the dies and withdrawing the articles from the cavities for further advance with the web.

These and other objects and advantages of the invention will be apparent from a consideration of the molding machine which is shown by way of illustration in the accompanying drawings wherein:

Figure 1 is a side elevation of a molding machine having incorporated therein the principal feature of the invention, portions of the machine being broken away;

Figure 2 is a horizontal section taken generally on the line 2—2 of Figure 1, with portions omitted;

Figure 3 is an end elevation, to an enlarged scale, the view being taken at the left hand end of the machine as shown in Figure 1, with portions broken away or omitted;

Figure 4 is an end view, to an enlarged scale, with portions broken away and with other portions in section, the view being taken generally on the line 4—4 of Figure 1;

Figure 5 is a cross section taken on the line 5—5 of Figure 1, to an enlarged scale;

Figure 6 is a cross section taken on the line 6—6 of Figure 1, to an enlarged scale;

Figure 7 is a vertical longitudinal section taken generally on the line 7—7 of Figure 2, to an enlarged scale;

Figure 8 is a horizontal section taken generally on the line 8—8 of Figure 7;

Figure 9 is a vertical longitudinal section taken generally on the line 9—9 of Figure 8;

Figure 10 is a horizontal longitudinal section taken generally on the line 10—10 of Figure 6, to an enlarged scale;

Figure 11 is a horizontal longitudinal section taken generally on the line 11—11 of Figure 9;

Figure 12 is a vertical longitudinal section similar to Figure 7 with the molding carriage at the opposite end of its travel;

Figure 13 is a view similar to Figure 12 with the molding elements in a different position;

Figure 14 is a view similar to to Figure 12 with the molding elements in a still different position;

Figure 15 is a cross section through one set of the molding elements, the view being taken on the line 15—15 of Figure 9, to an enlarged scale;

Figure 16 is a sectional view similar to Figure 15, the view being taken generally on the line 16—16 of Figure 13, to an enlarged scale;

Figure 17 is a sectional view similar to Figure 15, the view being taken on the line 17—17 of Figure 14, to an enlarged scale;

Figure 18 is a cross section taken generally on the line 18—18 of Figure 17, to a somewhat smaller scale;

Figure 19 is a sectional view, taken generally on the line 19—19 of Figure 18 and illustrating the next stage in the forming of the cup;

Figure 20 is a fragmentary section on a vertical plane illustrating the formation of the cup rim;

Figure 21 is a view partly in section and partly in vertical longitudinal elevation at the discharge end of the machine, the view being taken generally on the line 21—21 of Figure 2, to a greatly enlarged scale;

Figure 22 is a fragmentary cross section taken generally on the line 22—22 of Figure 8, to a greatly enlarged scale;

Figure 23 is a vertical section taken on the line 23—23 of Figure 22;

Figure 24 is a fragmentary side elevation illustrating certain of the controls for automatically operating the machine, the view being taken on the line 24—24 of Figure 4 and showing portions of Figure 1 to an enlarged scale;

Figure 25 is a cross section taken on the line 25—25 of Figure 24;

Figure 26 is a detail view of a switch control on the side of the machine which is opposite that shown in Figure 25, the view being taken on line 26—26 of Figure 4, to an enlarged scale;

Figure 27 is a fragmentary, longitudinal, vertical section taken on the line 27—27 of Figure 8, to an enlarged scale;

Figure 28 is a longitudinal section taken on the line 28—28 of Figure 27;

Figure 29 is a side elevational view of portions of the molding mechanism with a different form of stripping mechanism, illustrating a modification of the machine;

Figure 30 is a cross section taken generally on the line 30—30 of Figure 29;

Figure 31 is an end elevation of the mechanism shown in Figure 29 with the view being taken generally on the line indicated at 31—31 of Figure 29;

Figure 32 is a horizontal section taken generally on the line 32—32 of Figure 29 with portions broken away;

Figure 33 is a horizontal section taken on the line 33—33 of Figure 30, to an enlarged scale and with portions broken away;

Figure 34 is a horizontal section taken on the line 34—34 of Figure 29 with portions broken away and other portions omitted;

Figure 35 is a detail sectional view taken on the line 35—35 of Figure 33, to a larger scale, and with portions broken away;

Figure 36 is a detail section taken on the line 36—36 of Figure 33, to a larger scale, and with portions broken away;

Figure 37 is an enlarged elevational view of one corner of the stripper mechanism as shown in Figure 29;

Figure 38 is a detail elevation of a corner portion of the stripper mechanism as shown in Figure 31;

Figures 39A and 39B constitute a single diagrammatic view illustrating the electrical control circuits, and the various air and vacuum lines connecting the operating and control members of the machine;

Figure 40 is a chart illustrating the movement of the various elements which are carried on the molding carriage during a complete cycle of operations; and Figure 41 is a perspective view of a section of the plastic web with cups formed in a portion thereof.

The machine which is illustrated in the drawings is adapted to form or mold from a continuously traveling web 10 (Figure 41), of a suitable thermoplastic material, a plurality of relatively thin walled drinking cups 11. The cups 11 each have a truncated cone shape in their final form, when separated from the web 10, with a partially rolled lip or edge formation 12 (Figures 19 and 20) which remains with the cup when the latter is separated from the web 10. The cups 11 are formed in inverted position in the traveling web 10 and the web is initially cut into strips along the lines indicated at 13. The individual cups are separated from the strips after delivery from the machine by die cutting around the outside edge of the rim or lip 12. The cups 11 are formed as illustrated in Figure 41 in successive groups comprising six rows of six cups across with all of the cups in each group being shaped simultaneously in the machine.

The molding machine and its operation will be best understood by reference first to the main components of the machine and the manner in which they cooperate in the formation of the cups 11, with the separate elements being hereinafter described in detail. Briefly, the operative elements of the machine are mounted on two upright frame structures 15 and 16 (Figures 1 to 3). The larger or main frame structure 15, which is of generally rectangular form, carries the molding elements. The smaller or secondary frame structure 16 is located at the one end of the machine between the main frame 15 and an extruder head 17, the latter being supported on an overhead structure 18 by means of the chain 19. The secondary frame 16 carries a superstructure 20 on which a pair of web sizing rolls 21 and 22 are supported and between which the web 10 is fed to the end of the main frame 15. A web gripping and supporting conveyer structure 24 is mounted on the main frame 15 and has an upper horizontal run at an elevation to receive the web 10. A traveling carriage 25 is mounted on the main frame 15 for reciprocating movement in a horizontal direction and longitudinally of the frame 15. The carriage 25 carries the cup forming and molding elements which will be hereinafter described. The web 10 is advanced continuously through the machine by the web conveying and gripping structure 24 and the carriage 25 is reciprocated with its forward and retracting movements automatically controlled so that intermittently it advances through a predetermined path at the same speed as the movement of the web 10 and during its forward movement the molding elements carried thereon are operated to form a series of cups in a predetermined area of the web. The forming operations are completed when the carriage 25 reaches the end of its path in the direction of the advancing movement of the web and the carriage is returned to its initial starting position with the molding elements free of the web and the cycle of operations is repeated. The web 10 with the cups 11 molded therein, is advanced beyond the carriage 25, when the molding elements are moved to free the same, to the discharge end of the machine where the web is slit longitudinally by a slitting mechanism indicated at 26.

The molding head 17 (Figure 1) which is employed is of conventional construction and it will not be described in detail since its construction forms no part of the present invention. It is adapted to extrude continuously the web or sheet 10 of plastic film from a plastic material which provides the desired molding characteristics, which is of substantial thickness and which has the width required for the capacity of the machine. The preferred material is polystyrene plastic of a composition suitable for extruding in film or web form. Other materials having similar extruding and molding characteristics may be used, such as polyethylene.

The plastic film or web 10 is delivered from the nozzle 27 (Figure 1) of the extruder head to the secondary frame structure 16 where it passes between the sizing rollers 21 and 22 which are carried on the upright supporting frame 28. The rolls 21 and 22 are mounted on parallel shafts 30 and 31 which are journaled in suitable bearings in the vertical side members of the frame 28 with the upper roll 21 being urged toward the lower roll 22 by a suitable pressure mechanism indicated at 32. The roll shafts 30 and 31 carry at one end gears 33 and 34 which are operatively connected with cooperating worm sections 33' and 34' on a vertically extending drive shaft 35, the latter being journaled in suitable bearing brackets on one end of the frame 28. The shaft 35 carries at its lower end a gear 36 in operative engagement with a cooperating worm 37 on a cross shaft 38 which is journaled in suitable bearings in bracket members 40 on the frame 28. The cross shaft 38 carries at one end a pulley 41 connected by a belt 42 with a pulley 43 on a drive motor and gear reduction unit 44, the latter being mounted on a bottom frame 45 above which the supporting frame 28 extends and which forms the base of the secondary frame structure 16.

The base frame portion 45 of the secondary frame structure 16 carries at each of its four corners an inverted T-shaped bracket 46 in the lower end of which a pair of grooved rollers 47 are journaled for engagement on supporting tracks 48 secured on the floor or other supporting surface on which the apparatus is mounted. The brackets 46 are each connected for vertical adjustment at its upper end with a supporting bracket 49 which is in turn secured in upstanding relation on the side wall of the base frame 45. This arrangement permits the secondary frame structure 16 to be elevated and moved on the tracks 48 for proper adjustment both vertically and longitudinally of the machine. Suitable angle brackets 49' may be provided for securing the frame 16 in fixed adjusted position on the supporting floor.

The plastic web 10 is delivered from the sizing rolls 21 and 22 to the web conveying and supporting structure 24 (Figure 1) on the main frame 15 by means of which the web is advanced in a horizontal plane. The web conveyor 24 comprises a series of longitudinally extending laterally spaced tapes or belts 50 (Figures 1 and 3) which have their upper runs supported on grooved end pulleys 51 and 52 and intermediate support pulleys 53 and 54 which are mounted in transversely spaced relation on cross shafts 55, 56, 57 and 58, respectively. The cross shafts 55, 56, 57 and 58 are supported at their opposite ends in suitable bearings carried on oppositely facing side channel members 60 and 61, which side channel members are supported on two pairs of upright oppositely facing post forming channel members 62, 62' and 63, 63' at opposite ends of the main frame structure 15, with the post members being mounted in upstanding relation on oppositely facing bottom frame channels 64 and 65. The upper and lower frame side channels 60, 61 and 64, 65 are connected by suitable transverse bracing to form a rectangular frame. The main frame 15 is supported on the floor rails or tracks 48 in the same manner as the secondary frame structure 16 by means of four inverted T-shaped brackets 46 having rollers 47 which ride on the tracks 48, the supporting brackets being provided at each of the four corners of the frame structure.

The lower return runs of the web supporting tapes 50 are carried on end pulleys 66 and 67 which are mounted on bottom cross shafts 68 and 69, the latter being supported in suitable bearings carried on pairs of transversely spaced depending bracket members 70 and 71 on the bottom side frame channels 64 and 65. A tension adjusting pulley 72 is provided for each of the tapes 50 which is mounted on a cross shaft 72' which is carried on the free end of a bracket arm 73. The bracket arms 73 are adjustably mounted on a cross shaft 74 which extends between a pair of spaced upright angle bars 75 and 75' (Figures 3 and 21) which extend between the lower and upper cross frame members 76 and 77 at the discharge end of the machine.

The cross shaft 69 constitutes the main drive shaft for the machine. This shaft carries a sprocket (Figures 3 and 21) 78 which is connected by a driving chain 79 with a sprocket 80 on the output shaft of a motor and gear reduction unit 81, the latter being mounted on a platform type bracket 82 secured at the discharge end of the machine on cross frame channel member 76, the latter extending between the ends of the side channels 64 and 65. A suitably mounted tension sprocket 83 is provided for maintaining tension in the drive chain 79. This constitutes the main drive for the web conveyor 24 and also for certain other operating elements of the machine.

As the web is advanced by the conveyor 24 its opposite longitudinal side edges are gripped between the opposed runs of pairs of endless chains 84, 85 and 84', 85' (Figures 4 to 8, 21 and 23) which are supported on the side frame channel members 60 and 61. Since the web edge gripping chains and their mounting members on opposite sides of the machine are identical, only those members at one side of the machine will be described, the corresponding members on the opposite side of the machine being indicated by the same numerals primed.

The upper chain 84 (Figures 4, 5 and 21 to 23) is carried on a plurality of sprockets 86 which are arranged in longitudinally spaced relation on the ends of stub shafts 87 extending inwardly of a vertical support plate 88 which is connected to the side frame channel 60 by a plurality of longitudinally spaced inwardly extending brackets 89, the vertical plate 88 also being supported at the end of the machine on the angle cross member 77. The lower run of the chain 84 engages with the sprockets 86 while the upper run thereof is supported above the intermediate sprockets on pulleys 90 spaced between the sprockets 86 and carried on stub shafts or pins 91 extending inwardly of the vertical plate 88. The lower chain 85 has its upper run carried on a series of sprockets 92 which are mounted on longitudinally spaced stub shafts 93 extending inwardly of the vertical support plate 88. The sprocket supporting shafts 87 and 93 are arranged in staggered relation except at the ends of the chains where they are in vertical alignment. The sprockets 86 and 92 are in laterally offset vertical planes as shown particularly in Figure 22 and are vertically spaced so that the chain links mesh with each other and effect a corrugation of the edge portion of the web 10 in the longitudinal direction and also a corrugation in the transverse direction as shown in Figure 23. At the discharge end of the machine two of the stub shafts 93, one of which is the endmost shaft, carry sprockets 94 and 95 which are driven by a chain 96 traveling on a drive sprocket 97 on the main drive shaft 69. A suitably mounted tension sprocket 98 is provided for the chain 96. Thus each pair of chains 84, 85 and 84', 85' is driven in synchronism from the drive shaft 69 and the two pairs operate to grip the opposite side edges of the web 10 for advancing the web at a uniform rate through the machine while holding the same in a horizontal plane.

The molding carriage 25 (Figures 1 to 9), which is in the form of a box-like frame structure, comprises a pair of oppositely disposed rectangular side frame members 100 and 101 which are connected at their upper ends by an upper horizontal cross frame structure 102 and at their lower ends by a lower horizontal cross frame structure 103. The upper and lower carriage cross frame structures 102 and 103 are vertically spaced and arranged above and below the main side frame members 60 and 61. The upper and lower cross frame structures 102 and 103 carry the web gripping, forming and shaping elements which are mounted on relatively movable frames supported thereon. The upper cross frame 102 includes oppositely facing longitudinally extending side frame members 104 and 104' each of which comprises a pair of oppositely facing inner and outer channels 105 and 106 which are spaced laterally and connected by suitable cross members 107. The carriage side frame members 104 and 104' are connected at corresponding ends by the cross frame members 108 and 109, at the trailing and leading end of the carriage, respectively. Identical roller supporting brackets 110 (Figure 4) depend at each corner of the frame 102 and carry internally flanged rollers 111 on stub shafts 112, the rollers 111 riding on bearing plates 113 on the top flanges of the side frame channels 60 and 61 and supporting the entire weight of the carriage 25 for rolling reciprocating movement lengthwise of the machine. The cross frame member 108 at the trailing end of the frame 102 is an inwardly facing channel while the cross member 109 at the leading edge of the upper frame 102 has an inverted L-shaped cross section. The vertically extending flange 114 of the cross frame member 109 is cut out intermediate its ends at 115 (Figure 5) and a pair of cross bars 116 and 117 are secured in vertically spaced relation thereon to which are anchored the upstanding end portions of a plurality of guide rods or bars 118 which are spaced laterally of the machine and which have their other ends anchored to a pair of cross bars 120 (Figures 7 and 9) on the rear face or web of the cross channel member 108. The rods 118 have a bottom portion 121 which is in a horizontal plane and spaced immediately above the plane of movement of the web 10.

The upper carriage frame 102 carries thereon a subframe 122 of generally rectangular shape which is spaced below the side frame members 104 and 104' and which is mounted for vertical movement on two pairs of parallel links at opposite sides of the carriage. The rails forming the opposite sides of the frame 122 are each provided at the center with an upstanding bracket formation 123 and 123' of truncated triangular shape. The bracket 123 at one side of the frame 122 is connected adjacent its upper end by means of the pivot 124 to the end of the upper one of a pair of link bars 125 and 126 (Figure 7). The lower link bar 126, which is in the form of an adjustable rod has its one end pivotally connected at 127 to the side frame member immediately below the pivot 124. The other end of the lower link bar 126 is pivotally connected at 128 to a bracket 130 depending from the side member 104 of the frame structure 102. The upper link bar 125 is secured to a cross shaft 131 journaled at its opposite ends in the side members 104 and 104' of the frame 102. The frame 122 is connected at its other side in a like manner to a pair of corresponding link bars 125' and 126' and the cross shaft 131 is arranged with its axis in vertical alignment with the pivots 128 and 128'. The upper parallel link 125 is pivotally connected at 133 (Figure 7) to the bottom end of a vertically extending member 134 which constitutes the piston of an operating air cylinder 135, the latter being mounted on the cross frame member 109. The piston 134 is provided with a pair of axially spaced stop nuts 132 to limit its movement in both directions. A corresponding link operating mechanism is provided on the opposite side of the frame with the operating cylinder being indicated at 135'. The cylinders 135 and 135' are connected by suitable air lines 136 and 136' (Figure 5) with electrically operated control valves 137 and 137', the latter having a connection with the air supply line and being controlled by the switch 138 (Figures 1, 6 and 24) which is supported on an angle bracket 139 depending from the side member 104 of the carriage frame 102. The switch 138 has a swingably mounted bell crank operating arm 138' which is positioned for engagement by cam operating members 140 and 140' mounted on the outside edge of plate 113, on the top flange of the side channel 60 of the main frame of the machine. Vertical reciprocation of the operating pistons 134 and 134', of course, raises and lowers the frame 122 while the timing of the raising and lowering is regulated by the switch 138 and the setting of the operating cams 140 and 140' which are in the path of the switch arm 138' as the carriage 125 moves forward and then backward in its horizontal path along the side frame channels 60 and 61.

The vertically movable sub-frame 122 (Figures 6, 7 and 9) carries an inner frame structure which comprises vertically disposed longitudinally spaced end or cross plates 141 and 142 (Figure 9). The longitudinally spaced vertical cross plates 141 and 142 are adjacent opposite ends of the frame 122 and have their oppositely disposed end portions connected at 143 to the side rails of the frame 122. A horizontally disposed support plate 144 is attached to the lower edges of the cross plates 141 and 142, which support plate 144 is in a horizontal plane slightly above the top edges of the frame 122. The support plate 144 carries a series of equally spaced depending block formations or cavity die holders 145 arranged on the lower face of the plate in row forming depending relation.

Each of the die holding blocks 145 (Figures 15 to 20) is secured to the bottom face of the plate 144 by means of stud bolts 146 and each is recessed to receive therein a female die member 147, the latter being held in the recess by a pair of stud bolts 148. The molding die 147 is in turn recessed at 150 (Figure 17) to form a pocket or cavity having the shape of the exterior of the cup 11 or other article to be formed on the machine. The cavity 150 is relatively deep and the die member 147 is provided at its lowermost edge with a bead-like formation 151 for forming the rim or bead 12 on the cup 11, the bead-like formation 151 extending somewhat below the lowermost face 152 of the supporting or housing block 145. The cavity die 147 is externally slotted vertically at 153 on each of its faces with connecting slots 154 (Figure 18) across the top thereof. The lower portion of the die block 147 is reduced in cross section to provide a shallow passageway 155 between the block 147 and the housing block 145. A plurality of radial passageways 156 extend through the wall of the block 147 adjacent the lower lip forming edge 151 and connect with the passageway 155 which in turn connects with the slotted passageways 153 and 154. A series of vertically extending passageways 157 and 157' are provided in the bottom of the cavity 150 which extend through the bottom wall in communicating relation with the passageway forming slots 154 in the bottom outside face of the block 147 or the recess 158 which is provided in the bottom of the holder block 145. The recess 158 communicates with a vertical bore 160 in the center of the holder block 145 which has its top portion threaded to receive a nipple 161 for connecting the same with a vacuum line. The bore 160 extends through a shoulder forming portion 162 of the bottom face of the holder block 145 which is seated in an aperture 163 in the support plate 144. The nipple 161 connects through a conduit 164 (Figures 6 and 9) with one of a pair of pipes 165, the latter being supported above the plate 144 by angle brackets 167 which extend upwardly of the vertical end plates 141 and 142 of the subframe 122. Each of the molding pockets or cavities 150 in each of the die members 147 is connected in this manner to a vacuum line through one of the pipes 165. Each pipe 165 has at its ends electrically controlled valves 170 (Figures 1 and 3) which valves 170 are connected by conduits 172 with a vacuum tank 173. The tank 173 is mounted on brackets 174 at opposite ends thereof which are set on top frame members 175 extending between a pair of side plates 176 and 176' and which project above the side rails 60 and 61. The vacuum tank 173 is, of course, connected to a suitable vacuum pump (not shown).

Each die holder block 145 is formed with internal pipe coils 177 (Figures 17 and 18) in the walls thereof which are connected at the inlet end to a nipple 178 and at the outlet end to a nipple 180 for circulating a cooling fluid through the same. The inlet and outlet ends of the coil 177 extend through apertures 181 and 182 in the support plate 144. The nipples 178 and 180 are connected through conduits 183 and 184 (Figures 6 and 8) with inlet and outlet pipes 185 and 186 and the lines of pipes 185 and 186 are connected at their respective ends by pipes 187 and 188 which are connected in turn to a fluid supply pipe 190 and a discharge pipe 191. The pipes 185 and 186 are arranged in paired superimposed parallel relation above the support plate 144 and are supported at their ends in bracket formations 192 set in the frame end rails 141 and 142.

The upper cross frame 102 of the carriage 25 carries a subframe 193 (Figures 2, 4, 7 and 12) at its trailing end on which there is mounted a plurality of elongate, longitudinally, spaced transversely extending heat lamps 194 secured thereon by end bracket members 195. Baffle plates 196 depend between the lamps and are suitably supported on the frame 193. A transversely extending elongate heat lamp 197 is also secured on the bottom edge of the end frame member 108 by end brackets 198. The sub-frame 193 is fixed on the carriage cross frame 102 and extends above the path of the web 10 and the heat lamps 194 and 197 maintain the required temperature in the web until it passes into the forming area.

A cooperating lower molding frame 200 (Figures 4 to 10) is mounted in fixed relation on the carriage 25 below the path of travel of the web 10 being secured between the lower portions of the carriage side frame members 100 and 101 on the cross beam structure 103 (Figures 6, 9, 10 and 11). The lower molding frame 200 has side rails 201, 201' which are secured to the top of the cross beam 103 by relatively short angle brackets 202, 202' with the latter having their horizontal bottom flanges or legs attached by means of bolts 203, 203' extending through spacer members 204, 204'. The side rails 201, 201' are connected at their corresponding ends by cross rail members 205, 205' which are angle bars arranged in outwardly and downwardly facing relation with the vertically extending legs bolted to end brackets 206 and the latter in turn welded to the ends of the side rails 201, 201'.

The end cross rails 205, 205' each support on their upper flanges 207, 207' a pair of spaced vertically extending air cylinders 208. Each cylinder 208 has its piston 209 extending through an aperture 210 provided in the top flange of the respective cross rail member 205 or 205' and connected to a horizontal support plate 211 (Figures 6, 9 and 11). The support plate 211 which constitutes a frame for supporting web clamping elements lies above the carriage bottom cross frame 200 and is provided with rows of aligned apertures 212 of sufficient size to permit the male mold members or plug assists to pass therethrough. Each of the apertures 212 has associated therewith a clamping ring 213 (Figures 6, 9, 16 and 17) mounted on four depending corner posts 214 which carry compression springs 215. Each of the springs 215 engages at its upper end with the ring 213 and at its lower end with a shoulder formation or flange 216 on the upper end of a bearing sleeve 217 in which the corner post 214 is mounted for vertical sliding movement. Each bearing sleeve 217 is secured on the upper face of the plate 211 by a bolt 216' passing through a portion of the flange 216. Each corner post 214 is threaded on its bottom end and provided with a stop nut 218 which limits the upward movement of the ring 213. The rings 213 are each free to move downwardly against the force of the springs 215. The plate 211 which carries the entire clamping ring assembly is supported for vertical reciprocation relative to the carriage frame 200 on the four air cylinder pistons 209. The air cylinders 208 are connected in pairs by suitable conduits to two control valves 219, 219' (Figures 4 and 5) which are in turn connected by suitable conduits with the air supply line. The two valves are timed by operation of a control switch 220 (Figures 4 and 26) carried on a bracket 221 on the side frame 101' of the carriage 25 and having an operating arm 222 which is positioned to engage an operating cam plate 223 on the bottom flange of the main frame side channel 61 when the carriage 25 is horizontally reciprocated.

The plate 211 which supports the web clamping rings 213 forms a clamping frame which is adapted to be moved upwardly to bring the clamping rings 213 into engagement with the bottom face of the web 10. Each of the clamping rings 213 has on its upper edge a resilient gasket member 224 (Figures 16, 17 and 18) of rubber or similar material which cooperates with a clamping ring or gasket 225 secured by screws 225' to the bottom outer edge of a female die housing 145 to clamp the web between the two and hold a cup making section thereof in fixed relation to the forming members during the forming of the cup.

The die supporting frame 122 is locked in its down position so that it is held against the upward force of the clamping frame by inverted L-shaped locking or latching members 226 and 226' (Figure 6) at opposite sides of the top cross frame 102. The locking member 226 at the one side of the frame is pivoted at 227 on a bracket 228 upstanding from the side frame member 105 with its longer leg adapted to be swung in a path which will bring it into latching engagement with a top flange portion 229 on the bracket formation 123 on the frame 122 by an air cylinder 230 which is mounted on a transversely extending plate 107 of the side frame member 104 and has its piston 231 extending horizontally and in engagement with the lower end of the locking member 226. The locking member 226 is urged in the opposite direction toward unlocking position where it is disengaged from the bracket 123 by a compression spring 232 extending between the end of the upper or short leg of the locking member and the top flange of the frame member 105. The locking member 226' at the other side of the carriage is mounted in the same manner and operated by the air cylinder 230'. The two air cylinders 230 and 230' are connected by suitable conduits to a control valve 233 (Figure 5) which is timed for release of the lock members 226 and 226' by operation of a control switch 234 (Figures 4 and 26) carried on the bracket 221 with the control switch 220 for the clamp assembly and which has an operating arm 235 positioned to engage with the cam plate 223 when the carriage 25 is reciprocated. The locking members 226 and 226' are, of course, operated by the switch 234 and other electrical controls so as to lock the frame 122 when it reaches its down position shortly after the start of the forward movement of the carriage 25 and then release the same to allow it to move to its up position when the molding operations are completed and the carriage 25 is near the end of its forward stroke (Figure 40).

A series of male forming dies or plug assists 240 (Figures 4, 6, 7, 9, and 15 to 18) are mounted on a vertically reciprocable supporting frame 241 which is movably carried on the cross beam member 103 of the carriage 25. The plug supporting frame 241 is, of course, vertically reciprocable relative to the carriage bottom cross frame 200 since the latter is fixed on the carriage cross beam 103. The plug assists 240 each comprise an upper terminal or head portion or section 242 of which the exterior shape conforms generally to the interior shape of the cup. The molding head portion or section 242 is mounted on an upright post or stem section 243 which is provided with a vertical bore 244 in which a heating element 245 is secured with suitable leads 246 to a current supply. Each of the plug assists 240 is mounted in an aperture 247 in a horizontal supporting plate 248, the plug assists each having a bottom flange 249 which is bolted or otherwise secured to the plate 248. The plate 248 forms the upper side of the reciprocating frame 241 and is vertically spaced from an intermediate horizontal plate 250, which forms the main member of the frame 241. The two plates 248 and 250 are connected at their side and end edges by a peripherial frame 251 forming a spacer between the plates and the plate 250 is provided on its bottom face with a downwardly extending edge frame 252 (Figures 6, 9 and 10). A central box or bar formation 253 is secured on the bottom face of plate 250 which extends transversely of the machine above the cross frame member 103 and which has secured thereto at its opposite ends the pistons 254 and 254' of a laterally spaced pair of operating cylinders 255 and 255' (Figures 6 and 9) which are mounted in depending relation on a support plate 256, the latter being apertured at 257 and 257' to accommodate the pistons 254 and 254'. The support plate 256 is secured to a cutout center portion of the cross beam 103 by two angle bracket members 258 which are fastened to the plate 256 and to the spaced vertical plates 259 which form the depending walls of the cross beam 103. The bottom face of plate 250 is also provided with two elongate box-like frames 260 and 260' which are in parallel spaced relation on opposite sides of the center bar member 253 and have bottom portions which form part of a partly open bottom frame member 261 extending between the end rails of the edge frame 252. Two depending guide pins 262 and 262' are secured to the bottom of the frame member 261 beneath the frames 260 and 260' which guide pins 262 and 262' extend through apertures 263 and 263' in the support plate 256. The guide pins 262 and 262' are received in vertical sliding relation in guide sleeves 264 and 264' which are fastened to the bottom face of the support plate 256 by bolting or otherwise securing the flanged top edges thereto. The bottom plate 261 also carries four identical movement limiting or stop pins 265 (Figures 4, 5, 9 and 10). Each of the stop pins 265 extends through an aperture 266 provided in the base plate 256 and each pin is threaded to receive upper and lower stop nuts 267 and 268 which are adjustable thereon and engage with the plate 256 to limit the vertical movement of the frame 241 relative to the carriage bottom cross frame 200 in both directions.

The cylinders 255 and 255' are connected by suitable conduits to a pair of electrically operated control valves 269 and 269' (Figure 4) carried on the cross beam 103 and operation of these control valves is timed by the switch 270 (Figures 5 and 9) which is mounted on the bracket 271 depending from the frame member 205' and which has its operating arm 272 in the vertical path of movement of an operating bar 273 carried on the clamping frame 211.

The carriage 25 is moved on its forward stroke by locking the same to a longitudinally extending endless chain 275 (Figures 1, 7 and 9) which is supported at the center of the machine on end sprockets 276 and 277. The one end sprocket 276 is mounted on a stub shaft 278 journaled in a bearing bracket 279 which is supported on the end cross frame member 280. The other end sprocket 277 is mounted on a cross shaft 281 which is journaled in bearing brackets 282 supported on the lower side frame member 64 and 65. The shaft 281 carries a sprocket 283 which is connected by a drive chain 284 with a driving sprocket 285 on the main drive shaft 69. The side plates 259 of the cross beam 103 on the carriage 25 are cut out at 286 (Figures 4 to 6) to accommodate both runs of the chain 275 and vertically spaced guide shoes 287 and 287' are secured on the cross beam 103 beneath the two runs of the chain. A locking cylinder 288 (Figures 4 and 9) is supported on the one plate 259 of the cross beam 103 with its piston having on its free end a locking pin member 290 extending vertically and received in a vertical bore in a guide block 291 also secured on the plate 259 immediately above the upper run of the chain 275 so that the locking pin 290 will be projected against the upper run of the chain 275 to clamp the chain between the pin 290 and the guide shoe 287 upon operation of the cylinder 288. The cylinder 288 is connected by suitable conduit to an electrically operated control valve 292 (Figure 4) and the latter is timed by operation of switch 138 in the control circuit.

The carriage 25 is moved on its return stroke by a pair of air cylinders 293 and 293' (Figures 1, 2, 6 and 8) which are secured in the side frame members 104 and 104' of the top frame 102 of the carriage 25 and have the free ends of their pistons 294 and 294' bolted at 295 and 295' to upright brackets 296 and 296' (Figures 1 and 21). The air cylinders 293 and 293' are connected by suitable conduits to an electrically operated control valve 297 (Figures 5 and 8) and the latter is timed by a switch 298 (Figures 7, 8, 27, 28 and 39A) mounted with two other switches 299 and 300 adjacent the one end of the cross shaft 131 and operated by cam arms or plates 298', 299' and 300' on the end of the shaft 131. The shaft 131 rotates through an arc sufficient to operate the switch 298 as the female die or cavity frame 122 moves in its vertical path. As the frame 122 moves upwardly at the end of the molding cycle the switch 298 is operated to start the return stroke of the carriage 25 through operation of the valve 297 and the stroke cylinders 293 and 293'.

The switch 299 times the closing of the lock members 226 and 226' when the cavity frame 122 is down by operation of the valve 233 controlling the air cylinders 230 and 230'. The releasing or opening of the lock members 226 and 226' is timed by the switch 234, both switches 299 and 234 being tied in electrically with the switch 138 for controlling the raising and lowering of the cavity frame 122. The switch 300 is operated when the cavity frame 122 is lowered all the way to allow the raising of the clamp assembly frame 211 through operation of the control valves 219 and 219' and the air cylinders 208.

An air line 301 (Figures 1, 7 and 39A) is connected to the pipes 165 of the vacuum line so as to blow air through the female dies or forming cavities at a predetermined time when the vacuum is cut off by operation of the valves 170. The air line 301 has an electrically operated control valve 302 (Figure 5) which is operated by switch 299 at the proper time to break the vacuum and help force the cups from the cavities. Air is supplied through the line 301 to the cavities 150 just prior to the raising of the plug assist frame 241 to balloon the web slightly in the downward direction. A switch 303 (Figure 24) having an operating arm 303' is carried on the side frame 100 of the carriage 25 by bracket 304 and a cam plate 305 is mounted on the bottom of the side frame channel 60 for engaging the arm 303'. The switch 303 controls an air valve 306 (Figures 5 and 39B) by means of which the air is delivered to the cavities. A second switch 307 is also carried on the bracket member 304 which has an operating arm 308 adapted to engage the cam plate 305. The switch 307 is connected into the electrical control circuit (Figures 39A and 39B) for the plug assist frame 241 so that it delays the raising of the plug assist frame 241 until the web is acted upon by the air blow.

The carriage side frame 100 also carries a control switch 309 (Figures 4 and 24) which is connected with the controls for the valves 170 in the vacuum line and which is operative, when engaged with the control or cam plate 310 on the frame member 60, to hold the vacuum on for a period following the withdrawal of the plug assists 240 by lowering of the frame 241. A vacuum control switch 311 (Figures 5 and 39B) is mounted on the cross frame member 103 with the switch arm 312 extending into the vertical path of movement of an actuating bar 313 depending from the plug assist frame 241. The switch 311 is electrically connected with the switches 309 and 138 in the control circuit for operating the valves 170, this switch closing the circuit and turning on the vacuum at the end of the vertical movement of the plug assist frame 241.

The pressure in the several air lines which are employed to operate the various air cylinders is adjusted by means of suitable pressure control devices 315, 316, 317 and 318 (Figures 1, 8 and 39A) which may be conveniently mounted on the carriage 25.

The web 10 is advanced through the machine continuously by the conveyor 24 with the groups of cups being formed therein at spaced intervals as shown in Figure 41 and when the web reaches the end of the machine beyond the cup forming carriage 25 it is divided into a series of longitudinally extending strips by the slitting mechanism 26 (Figures 1 and 21). The discharge end of the web gripping conveyor 24 is spaced from the slitting mechanism 26 and a web feeding mechanism 320 (Figures 1, 2, 3 and 21) is provided which grips the web and feeds it to the slitting mechanism 26. The web feeding mechanism 320 comprises a lower driven roller 321 mounted on a cross shaft 322 which is journaled in the ends of the side frame members 60 and 61. The cross shaft 322 carries a sprocket 323 at one end which is connected by a chain 324 with a sprocket 325 on a stub shaft 326. The stub shaft 326 is journaled in bearing brackets 327 and 327' supported on the end frame members 63 and 75. The stub shaft 326 carries a sprocket 328 which is connected by chain 330 with a drive sprocket 331 on the main drive shaft 69. The web 10 rides on the roller 321 and is held in engagement therewith by a series of transversely spaced narrow rollers 332 each of which is carried on a shaft 333 journaled in the free end of a rectangular support arm or bracket 334 which has its other end mounted to swing on a cross bar 335 extending between the upstanding bracket members 296 and 296'. A pressure applying device is associated with each roller support bracket 334 which comprises a relatively short arm member 336 extending radially from the cross bar 335 in a generally horizontal direction and carrying a vertically extending pressure adjusting screw 337. The screw 337 has a shouldered lower end which bears against a compression spring 338 seated on a cross bar 340 on the roller support bracket. The screw 37 is in threaded engagement in a bore in the arm 336 and adjustment of the screw 337 varies the pressure of the roller 332 on the web 10. The pressure rollers 332 are spaced across the machine so as to engage the web 10 between the longitudinal rows of cups 11. The feed roller 321 and the cooperating pressure rollers 332 guide the web to the slitting mechanism 26.

The slitting mechanism 26 (Figures 1, 2, 3 and 21) comprises pairs of cooperating slitting disks 341 and 342 which are mounted in spaced relation transversely of the machine. The lower slitting disks 341 are mounted in transversely spaced relation on a cross shaft 343 which is journaled at its ends in suitable bearings mounted in upright bearing bracket members 344 and 344', the latter being connected at their lower ends by a bottom cross brace 345 which is connected thereto by means of end bracket plates 346 and 346'. The bearing brackets 344 and 344' are secured on the ends of the side frame members 60 and 61 and are connected at the top ends by a cross brace rod structure 347. The shaft 343 carries at one a sprocket 348 which is connected by drive chain 350 with a sprocket 351 on the driven shaft 322. The upper slitting disks 342 are each carried on a support pin 352 journaled in the lower end of a supporting bracket 353 which is secured at its upper end on a cross shaft 354 with the latter extending between the upper ends of the vertical bracket members 344 and 344'. The slitting disks 341 and 342 are arranged to engage the web 10 between the rows of cups 11 and slit the web on the lines 13 (Figure 41) to divide the web into narrow strips each carrying a single row of cups 11.

In the form of the machine as illustrated in Figures 1 to 29, the guide rods 118 are relied upon to engage the web between the rows of newly formed cups and prevent the cups from following the cavity dies when the die assembly frame 122 is elevated after the forming operation is completed. Thus the rods 118 function as a stripper device for stripping the cups from the dies. A modification of the machine is illustrated in Figures 29 to 38 in which a movable watercooled stripper assembly 360 is substituted for the stripper rods 118 on the molding carriage. In this form of the mechanism, the movable stripper mechanism 360 is, of course, carried on the upper frame 102 of the molding carriage 25.

The stripper assembly 360 comprises a rectangular frame 361 (Figures 29 to 31) which is supported for vertical reciprocation beneath the cavity die carrying frame 122 by means of air cylinders 362 which are arranged in spaced paired relation on opposite sides of the support plate 144. Each of the cylinders 362 is arranged vertically on an inverted U-shaped bracket 363 (Figures 29 to 32) which is bolted or otherwise secured to the top surface of the horizontal plate 144. Each cylinder 362 has its piston 364 extending downwardly through a guide sleeve 365 mounted on the lower face of the marginal portion of plate 144 and secured to the top edge of the side rail 366 of the frame 361. Each of the air cylinders 362 is connected by suitable conduit indicated at 367 and 368 with an air supply line. An electrically operated control valve 370 (Figure 39A) may be provided in the circuit supplying air to the cylinders 362.

The stripper frame 361 carries on its lower side a grid-like structure consisting of spaced transversely extending pipes 371 and transversely spaced longitudinally extending pipes 372, the latter being formed of a series of connected pipe sections with relatively long sections 373 extending between the pipes 371 and relatively short connecting pipe sections 374 which bridge over the pipes 371. The pipes 371 and 372 are all formed from pipe of rectangular cross section so that they are in effect hollow flat faced bars. The spacing of the hollow bars or pipes 371 and 372 is arranged so as to provide clearance for the die holders 145 and permit relative movement of the stripper frame 361 and the cavity die assembly, with the pipes 371 and 372 being adapted to move in the spaces between the die holders 145. The pipes 371 at the opposite sides of the frame 361 are supported on the bottom of the side rails 366 of the frame 361 while the intermediate pipes 371 are supported on the bottom of transversely extending cross rails 376, the latter being connected at their opposite ends to the end rails 376' of the frame 361. The side rails 366 and the intermediate rails 376 are cut out to accommodate the upper pipe sections 374 and the bottom faces of the pipes 371 and 372 are in a common horizontal plane. The transversely extending pipes 371 are provided at opposite ends with nipples 377 and 377' for connection to conduits 378 and 378' which lead to a cold water supply. The nipples 377 and 377' are fastened by clamp brackets 380 and 380' to the end cross members 376' of the frame 361. The conduits 378 and 378' have a suitable connection with cold water supply pipes 381 and 381' which are secured on the brackets carrying the water pipes 185 and 186 and are connected into the same cold water line as the latter.

The longitudinally extending pipe formations 372 each have their sections 373 and 374 connected at the ends to form a continuous conduit as shown in Figure 37 and the end sections 374' are provided at their outer ends with nipples 383 and 383' for connection ot conduits 384 and 384' which are in turn connected to the water pipes 385 and 385', the latter joining the ends of the pipes 381 and 381'.

In the operation of the machine (Figures 1, 39 and 40) the web 10 is extruded from the nozzle 27 and passes between the sizing rollers 21 and 22 to the upper run of the web supporting conveyor 24 where its side edges are gripped between the links of the two pairs of carrier chains 84, 85 and 84', 85' while the body of the web is carried on the tapes 50. The chains carry the web through the machine on a horizontal plane and deliver it when the cup forming operations are completed to the feed mechanism 320 at the discharge end of the machine which feeds the web to the slitting mechanism 26. The web 10 is advanced continuously by the conveyor 24 and the various molding operations are performed by the molding elements which are carried on the movable carriage 25 during the advancing movement of the web. The carriage 25 is supported on the side rails 60 and 61 and is moved with the web 10 by locking it to the drive chain 275. The locking pin or bolt 290 (Figures 7 and 39B) is moved into locking engagement with the chain 275 by operation of the cylinder 288 under control of the valve 292 and the switch 138 in the control circuit, the latter being carried on the carriage side frame 100 and being actuated by the members 140 and 140' upon movement of the carriage 25. The chain 275 is driven at the same speed as the web conveyor 24 and the carriage 25 advances with the web 10. As the carriage 25 begins its forward movement the cavity frame 122 which carries the cavity die holders 145 is moved downwardly by operation of the links 125 which are rotated about the shaft 131 by operation of the cylinders 135, 135' under the control of the valves 137, 137' which are in turn operated by the switch 138. When the die supporting frame 122 reaches its lowest point where the bottom edges of the die blocks 145 are adjacent the web 10 (Figure 15) it is locked in position by the latch members 226 and 226' which are operated through the cylinders 230, the latter being controlled by the valve 233 which is operated by the switch 220 on the carriage side frame 101. When the cavity frame 122 is locked, the web clamping frame 211 is moved upwardly to bring the clamping rings 213 into engagement with the bottom face of the web and to clamp the same against the bottom outer edges of the die blocks 145 (Figure 16) so as to hold a cup making section thereof in fixed relation to each set of forming members during the forming operations. The clamping frame 211 is moved upwardly by operation of the cylinders 208 under the control of the valves 219 which are actuated by the switch 220 on the carriage side frame 101. Upon the clamping of the web by the frame 211 the switch 303 on the side frame 100 of the carriage 25 actuates the control valve 306 to deliver a blast of air through the cavities against the sections of the web which are clamped to the bottom of the cavity die holders 145 for ballooning each web section in the direction of the male dies or plug assists 240. After the sheet or web is clamped by the clamping rings 213, the frame 241 carrying the plug assembly is raised by operation of the cylinders 255, 255' through the control valves 269 which are actuated by the switch 270 which is operated upon the raising of the frame 211. The switch 307 which is operated simultaneously with the switch 303 by the advancing movement of the carriage 25 delays the raising of the plug assembly frame 241 until the air blowing or ballooning operation is accomplished. The plug assembly frame 241 is raised a sufficient distance to bring each of the plug assists 240 to the position shown in Figure 17 within a die cavity, this movement causing each section of the heated web 10 to stretch over the forming end 242 of a heated plug assist 240. The movement of the plug assembly frame 241 is limited by proper adjustment of the stop nuts 267 and 268 on the movement limiting pins 265. When the plug assembly frame 241 reaches its uppermost position the switch 311 is operated and the valves 170 in the vacuum line are opened to apply suction to the molding cavities which causes the partially formed portions of the web to be sucked against the inner walls of the die cavities as shown in Figure 19 which strips the material from the plug assist 240 and forms each web section into the desired cup shape. The die cavities are cooled by circulation of cold water in the coils 177 and the cup formations are set in the shape of the internal walls of the dies which completes the forming operation except for the return of the clamping and forming members to their initial position and the removal of the cup formations from the die cavities. The plug assists 240 are withdrawn from the die cavities by retraction of the plug assembly frame 241 through operation of the cylinders 255 and 255' which is initiated by the switch 220 on the carriage side frame member 101, the cylinders being operated to retract the frame 241 when the switch arm 222 drops off the cam plate 223. Operation of the switch 234 at the same time actuates the valves 219, 219' to retract or drop the clamping frame 211 thereby releasing the web from clamped engagement with the bottom edges of the cavity blocks. Simultaneously, with the retraction of the clamping frame 211 the cavity frame locks 226 and 226' are released by operation of the valve 233 under control of the switch 220. When the plug assembly frame 241 is retracted, the switch 311 is operated and would normally turn off the vacuum in the cavities. However, the vacuum is held on by the operation of the switch 309 on the side frame 100 of the carriage 25 as the carriage advances. The vacuum is held on in the molding cavities for a predetermined period after the plug assists 240 are withdrawn by a retraction of the plug assembly frame 241. Advance of the carriage 25 operates the switch 138 which causes the valves 170 to operate to close the vacuum line and cut off the suction in the cavities. The cavity frame locks 226, 226' are released by operation of the cylinders 230, 230' under the control of the valve 233 and the switch 234. The cavity frame 122 is then elevated by operation of the cylinders 135 and links 125 under the control of the switch 138 when the latter is actuated by engaging the member 140' (Figure 24). Raising of the cavity frame 122 operates the switches 298, 299 and 300 through the rotation of the shaft 131 on which the links 125 are mounted. The switch 298 starts the return stroke of the carriage by operating the valve 297 controlling the cylinders 293 and 293'. The switch 300 operates the valve 292 which controls the cylinder 288 and releases the lock bolt 290 so as to free the carriage from the chain 275 and permit its return by the pistons 294 and 294'. The switch 299 operates the air valve 302 to break the vacuum as the cavity frame 122 moves upwardly.

When the machine is provided with the water cooled stripper device illustrated in Figures 29 to 38, the stripper frame 360 is moved downwardly to engage the upper face of the web and prevent the formed cups from following the cavity frame 122 as the latter is moved upward to its retracted position. The cylinders 362 are operated to move the stripper frame 360 downward against the web by the valve 370 (Figure 39A). As illustrated in Figure 40, the movement of the stripper frame 360 is controlled by operation of the valve 370 through the switches 299 and 138 to first lower the frame into contact with the sheet after the plug assembly frame 241 is moved upwardly and the vacuum is applied to the cavities and to then lower it a further distance at the completion of the forming operations, when the cavity frame 122 begins to move upwardly, with the frame 360 being raised to its initial inoperative position immediately prior to the end of the forward advance of the carriage 25.

While particular materials and specific details of construction have been referred to in describing the preferred forms of the molding machine, it will be understood that other materials and equivalent details of construction may be resorted to within the spirit of the invention.

We claim:
1. A molding machine comprising a main supporting frame structure and a secondary frame structure at one end thereof, means adjacent said secondary frame structure for extruding a web of plastic material, web sizing means on said secondary frame structure for receiving said extruded web, a traveling conveyor on said main frame structure having an upper horizontal run with laterally spaced gripper devices for clamping opposite side edges of the web and with traveling means for supporting intermediate portions of the web, means for operating the conveyor to advance the web continuously along a horizontal path, a molding carriage mounted on the main frame structure adjacent the upper run of said conveyor for reciprocating movement in a horizontal path, means for intermittently moving the carriage a predetermined distance in the direction of advance of the web at the same speed as the movement of the web and means for returning the carriage to its initial position, a molding die supporting frame mounted on said carriage for movement toward and from the top face of the web, a plurality of molding dies on said molding die frame having downwardly opening molding cavities, and means for applying suction to the die faces defining said cavities, an assist plug supporting frame mounted on said carriage in opposed relation to the molding die supporting frame and on the opposite side of the path of the web, a plurality of plug members mounted on said plug supporting frame in vertical alignment with the molding die cavities, a web clamping frame located on the same side of the path of the web as the plug supporting frame and reciprocably movable toward said web, a plurality of web clamping elements on said web clamping frame which clamping elements are constructed so as to engage portions of the web upon movement of said web clamping frame into clamping engagement with said molding dies and means for automatically reciprocating said molding die frame, said plug supporting frame and said web clamping frame in timed relation to the movement of the molding carriage and the web carrying conveyor.

2. A molding machine comprising a supporting frame structure, means for delivering a plastic web to one end of said frame structure, a traveling conveyor on said frame structure having an upper horizontal run with laterally spaced web grippers for engaging opposite side edges of the plastic web and laterally spaced belts intermediate the side edges thereof for supporting the intermediate portion of the web, means for operating the conveyor to advance the web continuously along a horizontal path, a molding carriage mounted on the frame structure adjacent said conveyor for reciprocating movement in a horizontal path, means for intermittently moving the carriage a predetermined distance in the direction of advance of the web at the same speed as the movement of the web and for returning the carriage to its initial position, molding die supporting frames mounted on said carriage on opposite sides of the path of movement of the web for movement toward and from the top and bottom faces of the web, a plurality of dies on one of said supporting frames having molding cavities therein and means for applying suction to said cavities, a plurality of plug members mounted on a second one of said supporting frames which is arranged in opposed relation to the die supporting frame on the opposite side of the path of the web, a plurality of clamping elements mounted on a third one of said supporting frames which third supporting frame is on the same side of the path of the web as the second supporting frame, said web clamping elements including spring pressed rings which are positioned upon movement of said third supporting frame in resilient engagement with the respective molding dies and means for automatically reciprocating said supporting frames in timed relation to the movement of the web carrying conveyor.

3. A molding machine comprising a supporting frame structure, means for delivering a plastic web to one end of said frame structure, a traveling conveyor on said frame structure having an upper horizontal run with laterally spaced web grippers for engaging opposite side edges of the plastic web and laterally spaced belts for supporting intermediate portions of the web, means for operating the conveyor to advance the web continuously along a horizontal path, a molding carriage mounted on the frame structure adjacent the upper run of the conveyor for reciprocating movement in a horizontal path, means for intermittently advancing and retracting the carriage with the advancing movement in the direction of advance of the web and at the same speed as the movement of the web, a plurality of supporting frames mounted on said carriage for movement laterally of the path of movement of said carriage and toward and from the faces of the web, a plurality of individual molding dies supported in row forming relation on one of said carriage frames and having molding cavities therein with means for applying suction to the cavities, a plurality of individual plug assists mounted in row forming relation on a second one of said supporting frames, said plug assist frame being arranged in opposed relation to the die carrying frame and being mounted on the opposite side of the path of the web, said molding dies and said plug assists being spaced on their respective supporting frames so as to accommodate the web supporting conveyor belts between the rows thereof, web clamping elements mounted on a third supporting frame, said web clamping frame being movable to bring the clamping elements thereon into clamping engagement with portions of said molding dies surrounding the mouths of the molding die cavities, and means for automatically moving said supporting frames toward and from each other in timed relation to the movement of the web carrying conveyor to clamp the web against the molding dies and to move the plug assists against the web and into the molding die cavities while the web and the molding carriage are advancing at the same speed.

4. In a molding machine having a supporting frame structure, a traveling conveyor on said frame structure with an upper horizontal run and laterally spaced web grippers for engaging opposite side edges of a web of moldable sheet material and means for operating the conveyor to advance the web continuously along a horizontal path, a molding carriage mounted on the frame structure adjacent said conveyor for reciprocating movement in a horizontal path, means for intermittently advancing and retracting the carriage with its advancing movement in the direction of advance of the web and at the same speed as the movement of the web, a plurality of support frames mounted on said molding carriage for movement laterally of the path of movement of the molding carriage and toward and from the faces of the web, a plurality of rows of molding dies mounted on one of said support frames having article shaping cavities and means for applying suction to said cavities, a plurality of rows of plug assist members mounted on a second one of said support frames for preliminarily shaping portions of the web, said molding die and plug assist support frames being positioned on opposite sides of the path of the web, a plurality of rows of individual web clamping elements mounted for resilient movement on a third one of said support frames, said web clamping support frame being positioned on the opposite side of the web from the molding die support frame and being movable toward said molding die support frame to bring said clamping elements into resilient clamping engagement with portions of said molding dies surrounding the cavities therein, and means for automatically moving the support frames toward and from each other in timed relation to the movement of the web carrying conveyor so as to clamp the web to the molding dies and simultaneously shape successive groups of articles in the web while the web is advancing.

5. In a molding machine having a supporting frame structure, a traveling conveyor on said frame structure having an upper horizontal run and laterally spaced web supporting belts for engaging the lower face of a web of moldable plastic sheet material, means for operating the conveyor to advance the web continuously along a horizontal path, a molding carriage mounted on the frame structure adjacent said conveyor for reciprocating movement in a horizontal path, means for advancing and retracting the carriage with its advancing movement in the direction of advance of the web and at the same speed as the movement of the web, a plurality of supporting frames mounted on said carriage for movement laterally of the path of the web and toward and from the faces of the web, a plurality of female molding members on one of said supporting frames having means for applying suction to the molding cavities formed therein, a plurality of male molding members mounted on a second one of said supporting frames, said female and male molding member supporting frames being arranged on opposite sides of the path of the web, a plurality of spring pressed web clamping elements mounted on a third one of said supporting frames, said clamping element supporting frame being on the same side of the path of the web as the male molding member supporting frame, said web clamping elements being positioned by movement of the supporting frame therefor toward the female molding member supporting frame into clamping engagement with portions of said female molding members, said female molding members, said male molding members and said clamping elements being arranged on their respective supporting frames in row forming relation between the belts on said conveyor, and means for automatically moving said female molding member supporting frame, said male molding member supporting frame and said clamping element supporting frame toward and from each other in timed relation to the movement of the conveyor.

6. A molding machine comprising a supporting frame structure, a traveling conveyor on said frame structure having a plurality of web supporting belts with an upper horizontal web supporting run, means for operating the conveyor to advance the web continuously along a horizontal path, a molding carriage mounted on the frame structure adjacent the upper run of the conveyor for reciprocating movement in a horizontal path, means for reciprocating the carriage including a drive chain mounted on the frame structure with a run thereof generally parallel with the upper run of the web supporting belts and operated to advance in the same direction and at the same speed as said belts, releasable means for locking the carriage to said drive chain so that the carriage is advanced by the drive chain a predetermined distance at the same speed as the web, means operative to release said locking means and means to return said carriage to its initial position, supporting frames mounted on said carriage for movement toward and from the faces of the web, a plurality of cavity forming molding dies on one of said supporting frames having means for applying suction to the cavities therein, a plurality of plug assists mounted on a second one of said supporting frames, said molding die and plug assist supporting frames being on opposite sides of the path of the web, a plurality of resiliently mounted web clamping elements on a third one of said supporting frames which is on the same side of the path of the web as the plug assist supporting frame, said web clamping elements being adapted to be positioned by movement of their supporting frame into clamping engagement with portions of said molding dies, and means for automatically moving said supporting frames toward and from each other in timed relation to the movement of the web carrying conveyor.

7. A molding machine comprising a supporting frame structure, means for delivering a plastic web to one end of said frame structure, a traveling conveyor on said frame structure having an upper horizontal run with laterally spaced web grippers for engaging opposite side edges of the extruded web and laterally spaced belts for supporting the intermediate portion of the web, means for operating the conveyor to advance the web continuously along a horizontal path, a molding carriage mounted on the frame structure adjacent said conveyor upper run for reciprocating movement in a horizontal path, a drive chain having a run parallel with the upper run of the conveyor, means for operating said drive chain at the same speed as the conveyor and in the direction of advance of the web, means for releasably locking the carriage to the drive chain to advance the carriage a predetermined distance with the web, supporting frames mounted on said carriage for movement toward and from the top and bottom faces of the web, a plurality of dies on one of said supporting frames having molding cavities therein and means for applying suction to said cavities, a plurality of plug members mounted on a second one of said supporting frames which is arranged in opposed relation to the die carrying frame and on the opposite side of the path of the web, a plurality of clamping elements resiliently mounted on a third one of said supporting frames which is on the same side of the path of the web as the plug member supporting frame, said web clamping elements being adapted to be positioned by movement of their supporting frame in resilient engagement with the respective molding dies, and means for automatically moving said supporting frames toward and from each other in timed relation to the movement of the web carrying conveyor.

8. In a molding machine having a supporting frame structure, a traveling conveyor on said frame structure having an upper horizontal run with laterally spaced gripper devices for clamping opposite side edges of a moldable plastic web, and with traveling means for supporting intermediate portions of the web, means for operating the conveyor to advance the web continuously along a horizontal path, a frame-like molding carriage mounted on said frame structure for reciprocating movement in a horizontal path and extending above and below said conveyor upper run, means for advancing the carriage a predetermined distance with the web at the same speed as the movement of the web, means for retracting the carriage to its initial position, a plurality of supporting frames mounted on said carriage for movement toward and from the top and bottom faces of the web, a plurality of molding dies on one of said supporting frames having molding cavities and means for applying suction to the die faces defining said cavities, a plurality of plug members mounted on a second one of said supporting frames which is arranged in opposed relation to the die carrying frame on the opposite side of the path of the web, a plurality of individual web clamping elements mounted on a third one of said supporting frames which is located on the same side of the path of the web as the second supporting frame, said web clamping elements being constructed so as to resiliently engage portions of the web when moved by said third frame into clamping engagement with said molding dies, said molding dies, said plug members and said clamping elements being spaced from each other on their respective frames for traveling in paths extending between the means for supporting the intermediate portions of the web, and means for automatically moving said supporting frames toward and from each other in timed relation to the movement of the web carrying conveyor.

9. In a molding machine having a traveling conveyor for supporting a continuous sheet of moldable plastic material, a molding carriage, means mounting the carriage for traveling a predetermined distance at the same speed and in the same direction as said conveyor and means for returning said carriage to its initial position, a series of supporting frames mounted on said carriage for reciprocating movement toward and from the opposite faces of said plastic sheet, one of said frames constituting a die support and having a plurality of cavity forming dies mounted thereon, another of said frames constituting a plug support and having a plurality of cooperating plug members mounted thereon, a third one of said frames constituting a clamping frame and having a plurality of ring-like clamping elements resiliently mounted thereon, said clamping elements being adapted to be moved into clamping relation with bottom open ends of the respective cavity forming dies upon movement of said clamping frame toward the plastic sheet, said die support frame and said plug support frame being connected together for movement relative to each other, air motors connected to said carriage and said frames for reciprocating the frames on said carriage, and means to automatically control the operation of said air motors comprising switch devices mounted on said cariage and operable in response to movements of said carriage.

10. In a molding machine having a traveling conveyor with a horizontal run for supporting a sheet of moldable plastic material, a box-like molding carriage having a cavity forming die supporting frame movably mounted thereon above the sheet supporting run of said conveyor and a plug supporting frame movably mounted thereon below the same, means mounting the carriage for advancing movement at the same speed and in the same direction as said conveyor and for retracting the carriage to its initial position, said supporting frames on said carriage being mounted for movement toward and from the opposite faces of said plastic sheet and toward and from each other, a plurality of cavity forming dies mounted on said die supporting frame, means for circulating a cooling fluid in said dies, a plurality of plug members mounted on said plug supporting frame, means for heating said plug members, a plurality of ring-like clamping elements resiliently mounted on a third supporting frame, said third supporting frame being mounted on said plug supporting frame so that it may be moved to position said clamping elements in clamping relation with the bottom ends of the respective cavity forming dies, air motors for moving said third frame on said plug supporting frame into and out of clamping position, air motors for reciprocating the die and plug supporting frames on said carriage, control valves for said air motors, and switch devices for operating said control valves mounted on said carriage and operable in predetermined sequence upon advancing and retracting movement of said carriage.

11. In a molding machine having a traveling conveyor for supporting a sheet of moldable plastic material, a molding carriage mounted for reciprocating movement in a path parallel with the path of the plastic sheet, means for advancing the carriage for a predetermined distance at the same speed and in the same direction as said conveyor, and for thereafter retracting the carriage to its initial position, a pair of die supporting frames mounted for reciprocation on said carriage toward and from the opposite faces of said plastic sheet, a plurality of female forming dies mounted on one of said supporting frames, means for circulating a cooling fluid through said female dies, means connecting said female dies to an air line, a plurality of cooperating male die members mounted on a second one of said supporting frames, means for heating said male die members, a plurality of ring-like clamping elements resiliently mounted on a third supporting frame, said third frame being mounted for reciprocation on the male die supporting frame whereby said clamping elements may be moved by reciprocation of their supporting frame into and out of clamping relation with bottom ends of the respective female dies, air motors for reciprocating the die and clamping element supporting frames, means to automatically control the operation of said air motors comprising switch devices mounted on said carriage and operable in response to movements of said carriage, and means operable upon predetermined reciprocating movement of said carriage to selectively connect said air line to a vacuum source or to an air pressure source for forming articles in said female dies and releasing the same therefrom.

12. In a molding machine having conveyor means for carrying a web of plastic sheet material along a horizontal path, a molding carriage, means for supporting said carriage for reciprocable movement along the path of the web, an endless drive member supported adjacent said web carrying conveyor means, means to operate said drive member at the same speed as said web carrying conveyor means, and means for intermittently locking said carriage to said drive member so as to move said carriage a predetermined distance in the same direction and at the same speed as said web, means for returning said conveyor to its initial starting point, and control means for said locking means including switches on said carriage and means for operating said switches at predetermined points along the path of movement thereof whereby to engage and disengage said locking means.

13. In a machine for molding a continuously traveling web of plastic film material, said machine having an endless traveling conveyor arranged with a web supporting run in a horizontal plane, a box-like carriage mounted for reciprocating movement along the horizontal run of said conveyor, means to advance and then retract the carriage in timed relation to the movement of the conveyor, a pair of horizontally disposed male and female die supporting frames mounted on said carriage for reciprocation thereon in a vertical direction and on opposite sides of the path of travel of the web, a plurality of pairs of cooperating male and female dies on said frames, means for moving the die supporting frames toward the web to engage the web between the dies so as to partially shape sections of the web on the male dies and thereafter move the partially shaped web sections into article forming cavities in the female dies, means for applying suction to the female dies to draw the partially shaped sections of the web into said dies and to cause each web section to take the shape of the cavity in the female die, means for moving the die supporting frames away from the web, and means for delivering a blast of air to each female die after the shaping of the web therein so as to break the suction and assist in the withdrawal of the shaped portions of the web from the die cavities.

14. In a machine for molding articles from a continuously traveling web of moldable plastic film material, said machine having an endless traveling conveyor arranged with a web supporting run in a horizontal plane, a carriage mounted for reciprocating movement along the horizontal run of said conveyor, means to advance and then retract the carriage in timed relation to the movement of the conveyor, a pair of horizontally disposed die supporting frames mounted on said carriage for reciprocation in a vertical direction, a plurality of cooperating male and female dies on said die supporting frames, means for moving said frames toward the web to engage the web with the male dies and partially shape sections of the web over the male dies and to move the partially shaped sections into die cavities in the female dies, means for applying suction to said female dies to draw the partially shaped web sections into the die cavities and to cause the web sections to take the shape of the cavities, a web stripping frame movably mounted on the female die supporting frame, said stripper frame having stripper bars extending between the female dies and means for moving said stripper frame on the female die supporting frame so as to engage said stripper bars with the web between the shaped portions thereof and force withdrawal of the shaped portions of the web from the die cavities.

15. In a machine for molding a plurality of articles from a continuously traveling web of moldable plastic film material, said machine having an endless traveling conveyor arranged with a web supporting run in a horizontal plane, a box-like carriage mounted for reciprocating movement along said conveyor, means to advance and then retract the carriage in timed relation to the movement of the conveyor, a pair of die supporting frames mounted in horizontally disposed relation on said carriage for reciprocation in a vertical direction, a plurality of cooperating male and female dies on said die supporting frames, means for applying suction to said female dies to draw sections of the web into said dies and to cause the web sections to take the shape of the molding cavities in said dies, and stripper means movably mounted on said carriage including a frame disposed in horizontal relation and having tubular sections extending between the female dies, means for circulating a cooling fluid in said tubular sections, and means for moving said stripper frame relative to said female die supporting frame to engage the tubular sections with the web and force the shaped portions of the web out of the die cavities.

16. In a machine for molding articles from a continuously traveling web of moldable plastic film material, said machine having an endless traveling conveyor arranged with a web supporting run in a generally horizontal plane, a carriage mounted for reciprocating movement along said conveyor, means for advancing said carriage a predetermined distance with the web and then retracting the carriage to its starting position, a pair of horizontally disposed die supporting frames mounted on said carriage for reciprocation in a vertical direction, a plurality of cooperating male and female dies on said die supporting frames, means for moving the female die supporting frame against one face of the web, means for moving the male die supporting frame against the opposite face of the web so as to partially shape the web on the male dies, means for applying suction to the female dies to draw the partially shaped portions of the web into the female dies and to cause the web portions to take the shape of the molding cavities in the female dies, a stripper frame mounted on the female die supporting frame, means for moving the stripper frame on the female die supporting frame after the shaping of the web portions to engage the web while the female die supporting frame is moved away from the web so as to assist in the withdrawal of the shaped portions of the web from the die cavities.

17. In a machine for molding articles from a continuously moving web of moldable plastic film material, an endless traveling conveyor arranged with a web supporting run in a horizontal plane, a molding carriage mounted for reciprocating movement along the horizontal run of said conveyor, means for advancing the carriage a predetermined distance with the web and thereafter returning the carriage to its starting position, a pair of horizontally disposed die supporting frames mounted on said carriage for reciprocation in a vertical direction, a plurality of cooperating male and female dies arranged in aligned spaced relation on said die supporting frames, means for moving the male die supporting frame toward the web to bring the male die members into engagement with the web and partially shape sections of the web on the male dies, means for connecting said female dies to a vacuum to draw the partially shaped web sections into the female dies and to cause the web sections to take the shape of the molding cavities in said female dies, a web stripper frame mounted on said carriage for reciprocating movement in a vertical direction, tubular stripper bars mounted on said stripper frame for movement between the female dies, means for supplying a cooling fluid to said stripper bars, and means for moving said stripper frame to bring said stripper bars into engagement with the web and to force the shaped portions thereof out of the female dies.

18. In a molding machine having a supporting frame, an endless traveling conveyor having a horizontally disposed run for supporting a web of moldable plastic film material in a horizontal plane, said conveyor comprising laterally spaced pairs of chains with the chains of each pair thereof arranged to travel on opposite sides of the web and to grip the edges of the web, and a plurality of endless belt members each having an upper run in the same horizontal plane as the upper run of the lowermost chains, said belt members being spaced laterally between the pairs of chains for supporting intermediate portions of the plastic web, a molding carriage mounted for movement back and forth along the horizontal run of said conveyor, means for advancing the carriage a predetermined distance with the web and for thereafter retracting the carriage to its starting position, a plurality of die supporting frames mounted on said carriage in vertically spaced relation for reciprocating movement transversely of the path of said web and toward and from the web, cooperating forming die members mounted in spaced relation on said die supporting frames which die members each have a width less than the distance between the web supporting belt members and which are aligned for movement between said belt members, a stripper frame mounted on said carriage for reciprocating movement transversely of the path of the web, said stripper frame having stripper bars arranged to move in the space between the dies and above the web carried on the conveyor belts and means for moving said stripper frame to bring the stripper bars into engagement with the web so as to hold the web on the conveyor belts during the molding operations and to strip the molded web from the dies when the die supporting frames move away from the web.

19. In a machine for molding articles from a continuously traveling web of moldable plastic film material, said machine having an endless traveling conveyor arranged with a web supporting run in a generally horizontal plane, a molding carriage mounted for reciprocating movement along said conveyor, means for intermittently advancing and retracting the carriage, a pair of horizontally disposed die supporting frames mounted on said carriage for reciprocation in a vertical direction, a plurality of cooperating male and female dies mounted on said frames, means for moving the female die carrying frame against one face of the web, means for moving the male die carrying frame against the opposite face of the web to partially shape the web on the male dies, means for applying suction to the female dies to draw the partially shaped portions of the web into the female dies and to cause the web portions to take the shape of the molding cavities in the female dies, a stripper frame mounted on the carriage for vertical movement relative to the female die carrying frame between engaging and non-engaging relation with the web, stripper bar members mounted on said stripper frame, means for operating said stripper frame to move the same against the web in the areas around the female dies, thereby to hold the web against its supporting conveyor while the female die carrying frame is moved away from the web so as to withdraw the shaped portions of the web from the die cavities and thereafter to move the stripper frame out of engagement with the web.

References Cited in the file of this patent

UNITED STATES PATENTS

| | | |
|---|---|---|
| 1,318,700 | Skolnick | Oct. 14, 1919 |
| 2,229,613 | Strauch | Jan. 21, 1941 |
| 2,282,423 | Kopitke | May 23, 1942 |
| 2,490,781 | Cloud | Dec. 13, 1949 |
| 2,736,150 | Loew | Feb. 28, 1956 |

FOREIGN PATENTS

| | | |
|---|---|---|
| 1,030,004 | France | Jan. 21, 1941 |
| 1,099,479 | France | Mar. 23, 1955 |
| 744,927 | Great Britain | Feb. 15, 1956 |
| 320,447 | Switzerland | May 15, 1957 |

OTHER REFERENCES

"Deep-Draw Vacuum Forming," published by Plastics Technology, January 1958, New York (cover page and p. 44).